MACHINE FOR RECORDING ON MAGNETIC TAPE

Filed Aug. 20, 1953

23 Sheets-Sheet 1

INVENTORS
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS Feb. 17, 1959 A. BLAIN ET AL 2,874,369

MACHINE FOR RECORDING ON MAGNETIC TAPE

Filed Aug. 20, 1953 23 Sheets-Sheet 2

INVENTORS
ALBERT BLAIN
HERBERT F. WELSH
LOUIS D. WILSON
FRANK REED
EDWIN O. ROGGENSTEIN
SAUL MEYER

BY George V. Eltgroth J. L. Sterling
ATTORNEYS

Feb. 17, 1959 A. BLAIN ET AL 2,874,369

MACHINE FOR RECORDING ON MAGNETIC TAPE

Filed Aug. 20, 1953 23 Sheets-Sheet 3

INVENTORS
ALBERT BLAIN
HERBERT F. WELSH
LOUIS D. WILSON
FRANK REED
EDWIN O. ROGGENSTEIN
SAUL MEYER

BY

ATTORNEYS

INVENTORS
ALBERT BLAIN
HERBERT F. WELSH
LOUIS D. WILSON
FRANK REED
EDWIN O. ROGGENSTEIN
SAUL MEYER
BY George V. Eltgroth Jr. L. Sterling
ATTORNEYS

MACHINE FOR RECORDING ON MAGNETIC TAPE

Filed Aug. 20, 1953 23 Sheets-Sheet 5

INVENTORS.
ALBERT BLAIN
HERBERT F. WELSH
LOUIS D. WILSON
FRANK REED
EDWIN O. ROGGENSTEIN
SAUL MEYER
BY George V. Eltgroth Jr. L. Sterling
ATTORNEYS

MACHINE FOR RECORDING ON MAGNETIC TAPE

Filed Aug. 20, 1953 23 Sheets-Sheet 6

INVENTORS
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS Feb. 17, 1959 A. BLAIN ET AL 2,874,369

MACHINE FOR RECORDING ON MAGNETIC TAPE

Filed Aug. 20, 1953 23 Sheets-Sheet 7

INVENTORS.
ALBERT BLAIN
HERBERT F. WELSH
LOUIS D. WILSON
FRANK REED
EDWIN O. ROGGENSTEIN
SAUL MEYER

BY George V. Eltgroth J. L. Sterling

ATTORNEYS

INVENTORS.
ALBERT BLAIN
HERBERT F. WELSH
LOUIS D. WILSON
FRANK REED
EDWIN O. ROGGENSTEIN
SAUL MEYER

BY George V. Eltgroth J. L. Sterling
ATTORNEYS

Feb. 17, 1959 A. BLAIN ET AL 2,874,369

MACHINE FOR RECORDING ON MAGNETIC TAPE

Filed Aug. 20, 1953 23 Sheets-Sheet 9

*INVENTORS.*
ALBERT BLAIN
HERBERT F. WELSH
LOUIS D. WILSON
FRANK REED
EDWIN O. ROGGENSTEIN
SAUL MEYER
BY George V. Eltgroth Jr. L. Sterling
ATTORNEYS INVENTORS.
ALBERT BLAIN
HERBERT F. WELSH
LOUIS D. WILSON
FRANK REED
EDWIN O. ROGGENSTEIN
SAUL MEYER
BY George V. Eltgroth Jr. L. Sterling
ATTORNEYS

MACHINE FOR RECORDING ON MAGNETIC TAPE

Filed Aug. 20, 1953 23 Sheets-Sheet 11

INVENTORS.
ALBERT BLAIN
HERBERT F. WELSH
LOUIS D. WILSON
FRANK REED
EDWIN O. ROGGENSTEIN
SAUL MEYER
BY George V. Eltgroth Jr. & Sterling
ATTORNEYS INVENTORS,
ALBERT BLAIN
HERBERT F. WELSH
LOUIS D. WILSON
FRANK REED
EDWIN O. ROGGENSTEIN
SAUL MEYER
BY George V. Eltgroth J. L. C. Sterling
ATTORNEYS

MACHINE FOR RECORDING ON MAGNETIC TAPE

Filed Aug. 20, 1953 23 Sheets-Sheet 13

INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS

MACHINE FOR RECORDING ON MAGNETIC TAPE

Filed Aug. 20, 1953 23 Sheets-Sheet 14

INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS

MACHINE FOR RECORDING ON MAGNETIC TAPE

INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS

MACHINE FOR RECORDING ON MAGNETIC TAPE

Filed Aug. 20, 1953 23 Sheets-Sheet 17

INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS

MACHINE FOR RECORDING ON MAGNETIC TAPE

Filed Aug. 20, 1953

INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS

MACHINE FOR RECORDING ON MAGNETIC TAPE

Filed Aug. 20, 1953 23 Sheets-Sheet 19

INVENTOR.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS

MACHINE FOR RECORDING ON MAGNETIC TAPE

Filed Aug. 20, 1953

INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS INVENTORS.
ALBERT BLAIN
HERBERT F. WELSH
LOUIS D. WILSON
FRANK REED
EDWIN O. ROGGENSTEIN
SAUL MEYER
BY George V. Eltgroth Jr. & Sterling
ATTORNEYS

MACHINE FOR RECORDING ON MAGNETIC TAPE

Filed Aug. 20, 1953 23 Sheets-Sheet 22

INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. L. Sterling
ATTORNEYS INVENTORS.
ALBERT BLAIN
HERBERT F. WELSH
LOUIS D. WILSON
FRANK REED
EDWIN O. ROGGENSTEIN
SAUL MEYER
BY George V. Eltgroth J. R. L. Sterling
ATTORNEYS United States Patent Office 2,874,369

Patented Feb. 17, 1959

2,874,369

MACHINE FOR RECORDING ON MAGNETIC TAPE

Albert Blain, Herbert F. Welsh, Louis D. Wilson, Frank Reed, and Saul Meyer, Philadelphia, Pa., and Edwin O. Roggenstein, Norwalk, Conn., assignors, by mesne assignments, to Sperry Rand Corporation, New York, N. Y., a corporation of Delaware Application August 20, 1953, Serial No. 375,359

19 Claims. (Cl. 340—174)

This invention relates to a machine for preparing a magnetic tape with data, in code form, to be used in a computer of the electronic type.

A high speed automatic electronic computer receives data to be acted upon, and instructions for arranging and calculating the magnetically induced data from a magnetic tape as one source of data supply. The speed at which the computer performs its work necessitates advance preparation of the data in such a manner that it will be correct and will be in sufficient quantity. Magnetic tapes which feed data in code form to the computer may provide data at a rate of more than ten thousand characters a second so that with the tapes prepared in advance, the set-up times for the various problems are reduced to a minimum. The tapes are handled in reels and a reel of tape that has been prepared in the machine is placed in a unit which feeds the tape across a magnetic reading head to transfer the coded data from the tape into the computer.

It is an object of the invention therefore to provide a machine in which alphabetic, numeric and symbolic characters are converted to pulses and magnetically induced in code form on a tape and at the same time are recorded so that the operator of the machine will have a visual check on the material that is being entered on the tape.

It is a further object of the invention to provide a machine in which the number of characters that should be entered in a given block or length of tape is determined and the machine locked against entry of further data either in code form on the tape or in visual form on the record.

Other objects of the invention are the provision of a machine in which the feed of a tape, upon which data is being induced magnetically is coordinated with the feed of a record carriage so that erasure and backspacing can be accomplished to provide maximum speed of error correction; to prevent the operation of two keys simultaneously; to prepare a tape so that blank spaces will not be possible in areas intended to carry data; to prevent the operator from moving the record platen carriage by hand in either direction and with it the tape; to compel the operator to fill each block or area of the tape before the carriage can be returned or the tape advanced; to provide in a conventional keyboard a group of keys for facilitating the entry of certain data and to greatly reduce the manufacturing cost of the equipment and simplify the maintenance thereof.

Other objects and advantages of the invention will be apparent during the course of the following description.

In the accompanying drawings, forming a part of this specification and in which like numerals are employed to designate like parts throughout the same Figs. 1 and 1A combine to provide a view in sectional elevation taken from front to back of a machine constructed in accordance with the invention;

Figs. 2 and 2A combine to provide a view in rear sectional elevation of the machine shown in Figs. 1 and 1A, taken on the line 2—2 of Fig. 1A;

Figures 1, 41:
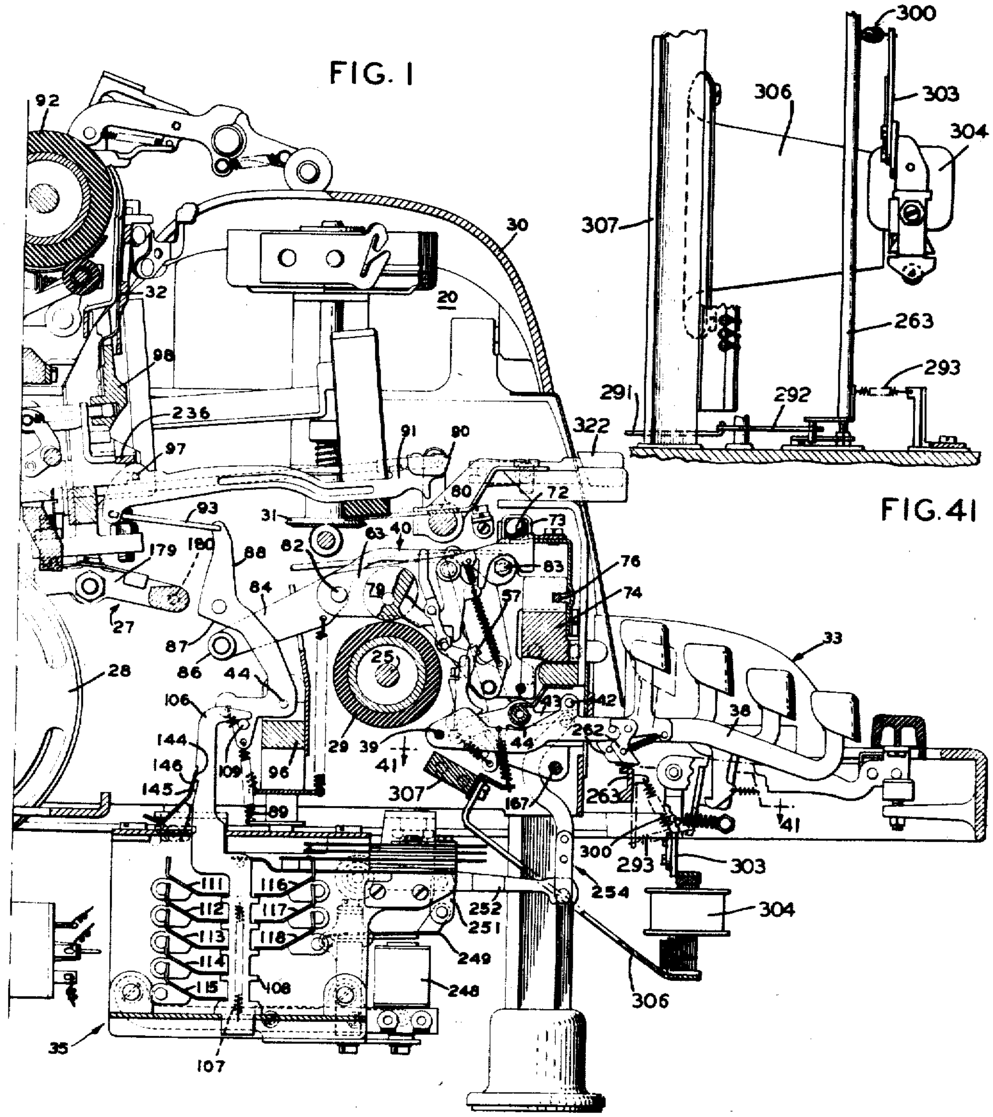
Fig. 41 is a section on the line 41—41 of Fig. 1 showing the line lock bar operating mechanism.
Figure 1A:
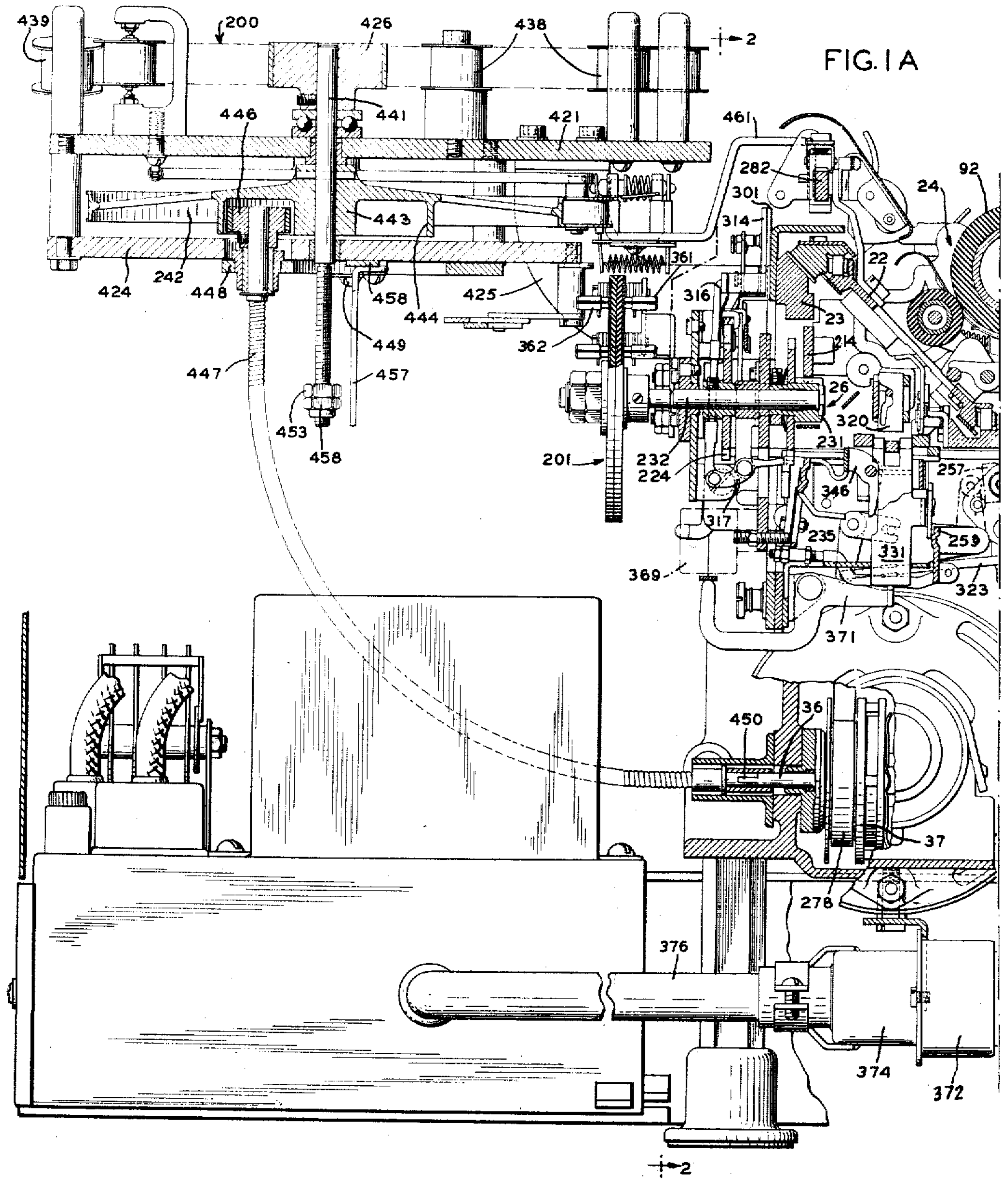
Figures 3, 7, 8:
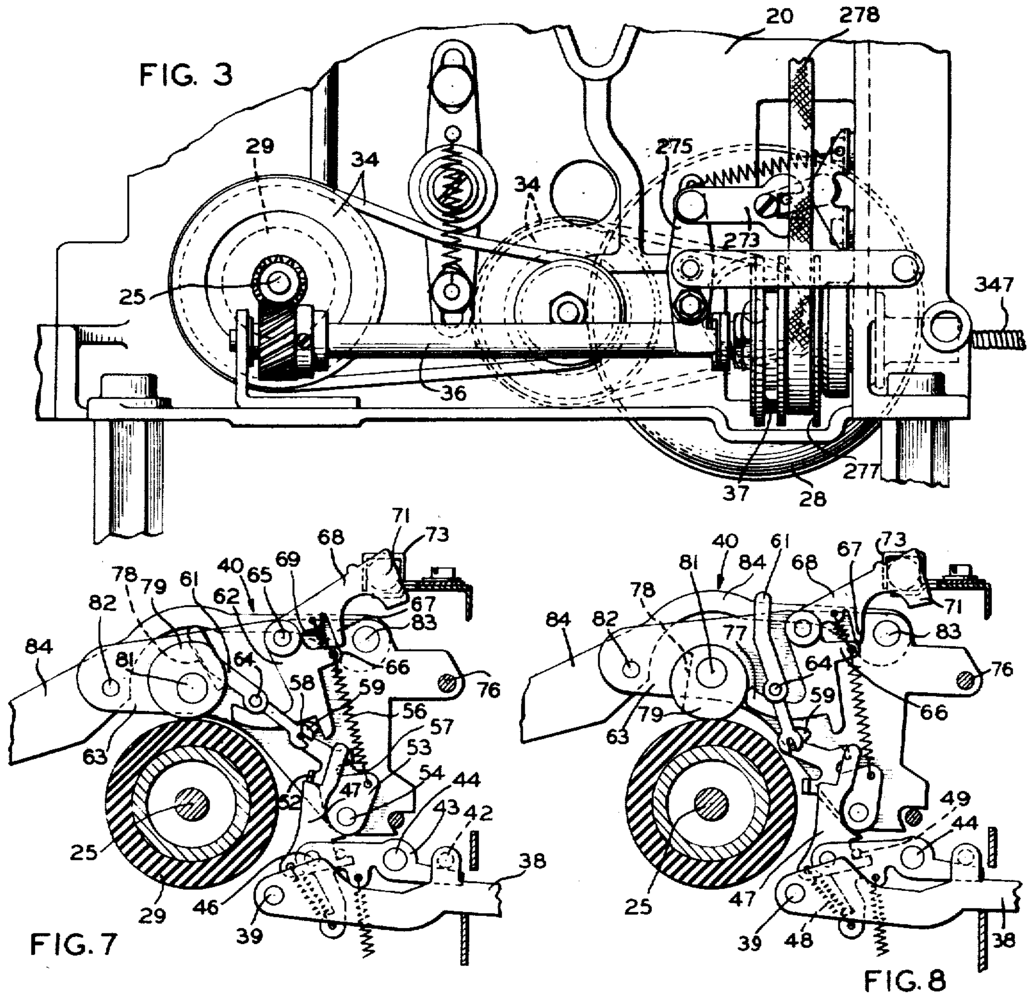
Fig. 3 is a view looking at a portion of the right side of the machine showing the driving mechanism.
Fig. 7 is a side view of the key lever power mechanism shown in Fig. 1 with the power roll conditioned for operation and the ball lock in use.
Fig. 8 is a view similar to Fig. 7 showing the positions assumed by the parts during a phase of operation.

Referring to the drawings in detail and in particular to Figs. 1 and 1A, a power operated typewriter is shown which includes right and left hand side frames 20 and 21 respectively connected by a carriage runway 23 supporting a movable platen carriage 22 and paper or work sheet feed roll assembly 24; an escapement assembly 26 for controlling the feed of the carriage; a shift mechanism 27 for raising and lowering a type bar segment for upper and lower case printing respectively; a drive unit including a motor 28, a power roll shaft 25, and a power roll 29 on said shaft; ribbon feed and vibrating mechanisms 31 and 32 respectively and various cross bars and rods for the support of the operating parts of the structure which is enclosed in a panelled housing 30 attached to said frames. The keys of a keyboard 33 are operated to cause characters to be printed on a record or work sheet held about a platen and to also control the operation of the typewriter and an encoding unit 35 which is suspended from the underside of said side frames. The motor 28 (Fig. 3) has a set of belt and pulley driving connections 34 with the power roll shaft 25 and through suitable gearing with a counter drive shaft 36 for return of the carriage 22 through a belt, a belt operating drum and a control clutch 37.

The power roll 29 is employed to carry out most of the operating functions of the parts and the printing of the characters through key lever power mechanisms 40 under control of the keyboard. The operation of one character printing type bar starts with the depression of a key lever 38 (Figs. 1, 7–9) which is pivoted on the fulcrum rod 39 and carries a stud 42 for rocking a bell crank 43 on its shaft 44. The bell crank has pivoted thereto as at 46 a lift pawl 47, maintained in vertical position by a spring 48, and a pin and notch combination 49 so that the shoulder 51 on said pawl engages a tab 52 on a power trip lever 53 to lift and swing the latter clockwise about its pivot 54 against the resistance of a spring 56. The trip lever 53 has a motion limiting ear 57, a stud 58 and a nose 59 at its free end. The stud 58 engages the forked end of a roller trip arm 61 to swing the latter counterclockwise while the nose 59 swings a roller detent 62 in like direction. The trip lever 53 is pivoted to a power arm 63 and the trip arm 61 and the detent 62 are likewise pivoted to said power arm by their respective pivot pins 64 and 65. The detent 62 has a laterally extending lug 66 constituting a rest for the offset depending finger 67 of a ball lock arm 68 which is pivoted to the detent 62 and connected thereto by a spring 69. The lock arm 68 has a splayed end 71 thereon as thick as the total space that can be accumulated in a horizontal plane diametrically between any two balls in a row of aligned balls 72 held for free movement longitudinally in a hollow transversely slotted box-shaped ball retainer 73. The retainer is attached to a cross bar 74 in which a fulcrum wire 76 is held and on which the power arm 63 is pivoted. The detent 62 is provided with a spatulate end 77 adapted to seat in a chordal slot 78 cut in the periphery of an eccentric cam roller 79 pivoted as at 81 to the power arm 63. The latter has secured thereto, through the medium of a pivot 82 and an adjustable connection 83, a power arm extension 84 the outer free end of which carries a roller 86 for engagement with the camming edge 87 of a type bar bell crank 88. The roller rocks the bell crank 88, against the resistance of a spring 89, to swing the head 90 of a type bar 91 against the platen 92 through a pull link 93. The bell crank is pivoted on a fulcrum rod 94 supported on a cross bar 96 and the type bar is pivoted as at 97 in a type bar segment 98 which forms a part of the case shift mechanism 27.

The power roll 29 is constantly driven in clockwise direction and when the key 38 has been depressed (Fig. 7) the power trip lever 53 is rocked clockwise to swing both roller trip arm 61 and roller detent 62 counterclockwise to force the splayed end 71 of the lock arm 68 between the balls 72; to remove the spatulate end 77 of the roller detent 62 from the slot 78 and to cause the free end of the roller trip arm 61 to engage the cam roller 79 at the end of the slot to give the roller a sufficient rotary movement clockwise to cause it to engage the surface of the power roll 29. The rotary motion of the roll (Fig. 8) will swing the power arm 63 about its pivot 76 and impart movement to the extension 84. A set of the key lever controlled mechanisms is provided not only for each type bar but for each of the function controlling keys of the keyboard and it is necessary to prevent simultaneous operation of more than one of the sets of mechanisms, controlled by the keys, without preventing some operational movement of the keys themselves. The speed at which an operator can type is reduced when the key levers are directly locked by a conventional ball unit. Through the ball unit, used to lock a part of the mechanism as herein disclosed, when a first key is depressed (Fig. 8) and the end 71 of the related lock arm 68 is between balls, the spatulate end 77 of the roller detent 62, riding on the periphery of the cam roller 79, prevents the end 71 of the arm 68 from dropping out from between adjacent balls until the power arm extension 84 has made its movement, even if the finger of the operator is removed from the key. During this time the operator may depress a second key in the typing sequence with the result that the key lever 38 will move down far enough to cause the associated ball lock 68 to swing until the splay end 71 thereof is stopped by the ball unit which is closed because of the take-up in the spacing by the initially operated lock arm 68 of said first key. The swinging movement of the lock arm 68 associated with the second key (Fig. 9) is not sufficient to remove the end 77 from the slot 78 of the cam roller 79 or to cause the roller to be rotated enough to contact the power roll 29. The instantaneous operation of said initially operated lock arm 68 (Fig. 8) when the stroke of the power arm extension 84 is completed, opens the ball unit and the extremely small additional movement of the second key members 61 and 62 (Fig. 9) is sufficient to condition the cam roller for operation and close the ball unit much faster than would be the case if operation of one key lever depended upon release of a second key lever. The time taken to operate the second key lever is saved because it can occur during the action of the mechanism inaugurated by the operation of the first key lever.

Figure 9:
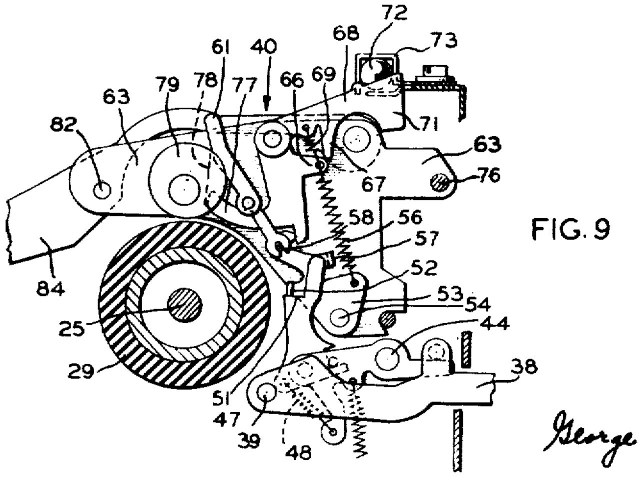
Fig. 9 is a view showing the positions assumed by two sets of mechanisms when two keys are pressed simultaneously.

If two keys are pressed simultaneously, the splayed end of each arm 68 will take up one half the available space in the ball unit and both ends will be prevented from getting between the balls with the result that neither set of parts 61, 77 can condition the respective cam rollers for operation, this condition being also illustrated in Fig. 9. The device also guards against damage to the machine when a power failure occurs when the switch is "on." If a character or functional key is depressed when the power roll 29 is not rotating, the cam roller 79 is forced into contact with the power roll 29 by being rotated slightly by the roller trip arm 61 as in Fig. 7. However, when the key 38 is released, and rises, the spatulate end 77 of the roller detent 62 will be forced against the periphery of the cam roller 79 beyond the slot by spring 56 but still keeping the splayed end 71 of the key lock arm 68 between the balls of the unit so that no other key lever can be depressed until the power roll completes the cycle of the conditioned cam roller and restores the roller detent 62 and its end 77 to normal position as shown in Fig. 1. In view of the fact that one key may be depressed before the previously pressed one is restored, the operator may type at a rate determined by the speed of the machine. In order that the momentum of the lock arms 68 will not carry the splay ends thereof beyond the median line of the balls 72, a cushion or limit wire 80, tensioned between the side frames 20 and 21, extends longitudinally of the ball retainer 73 in properly spaced relation thereto.

*Encoding unit*

Figure 4:
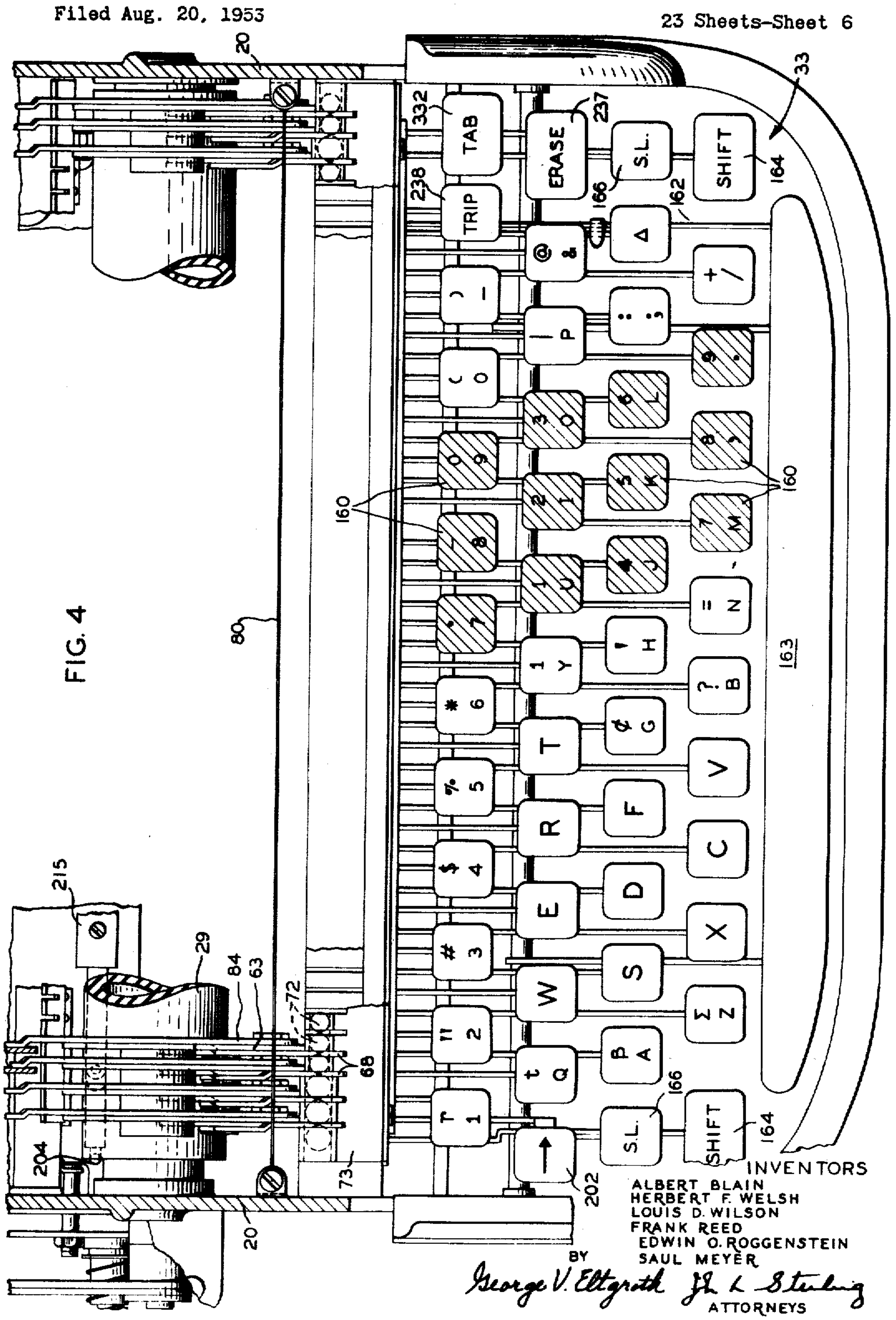
Fig. 4 is a plan view of the keyboard portion of the machine and some of the key lever mechanisms.

Each of the key controlled power mechanisms 40 above described is connected to the encoding unit 35 which converts into code the various characters and machine function designations shown on the keyboard 33 (Fig. 4). The latter contains the conventionally arranged upper case alphabetic character keys, numeral and symbol keys and machine function control keys. Every letter, numeral, symbol and function designation of the keyboard has a code representation that is induced on a magnetic tape and for the purpose of accommodating all of these designations the upper and lower parts of the type heads are used for the printing thereof. As an example the upper left key "r" "1" will print, in the upper case position, the "r" which is a "carriage return" symbol, Fig. 11, and will print in the lower case position the numeral "1." Reference is made to upper and lower case simply to designate the upper and lower parts of the type head, as no lower case alphabet type is used except for symbol purposes. All alphabetic writing is done in upper case or capital letters, but these are actually in the lower case positions on the keyboard and in the lower portions of the type heads of the corresponding keys. The use of "upper and lower case" herein, indicates the position of the character on the type head rather than the meaning ordinarily implied of capital and small type.

Figure 5:
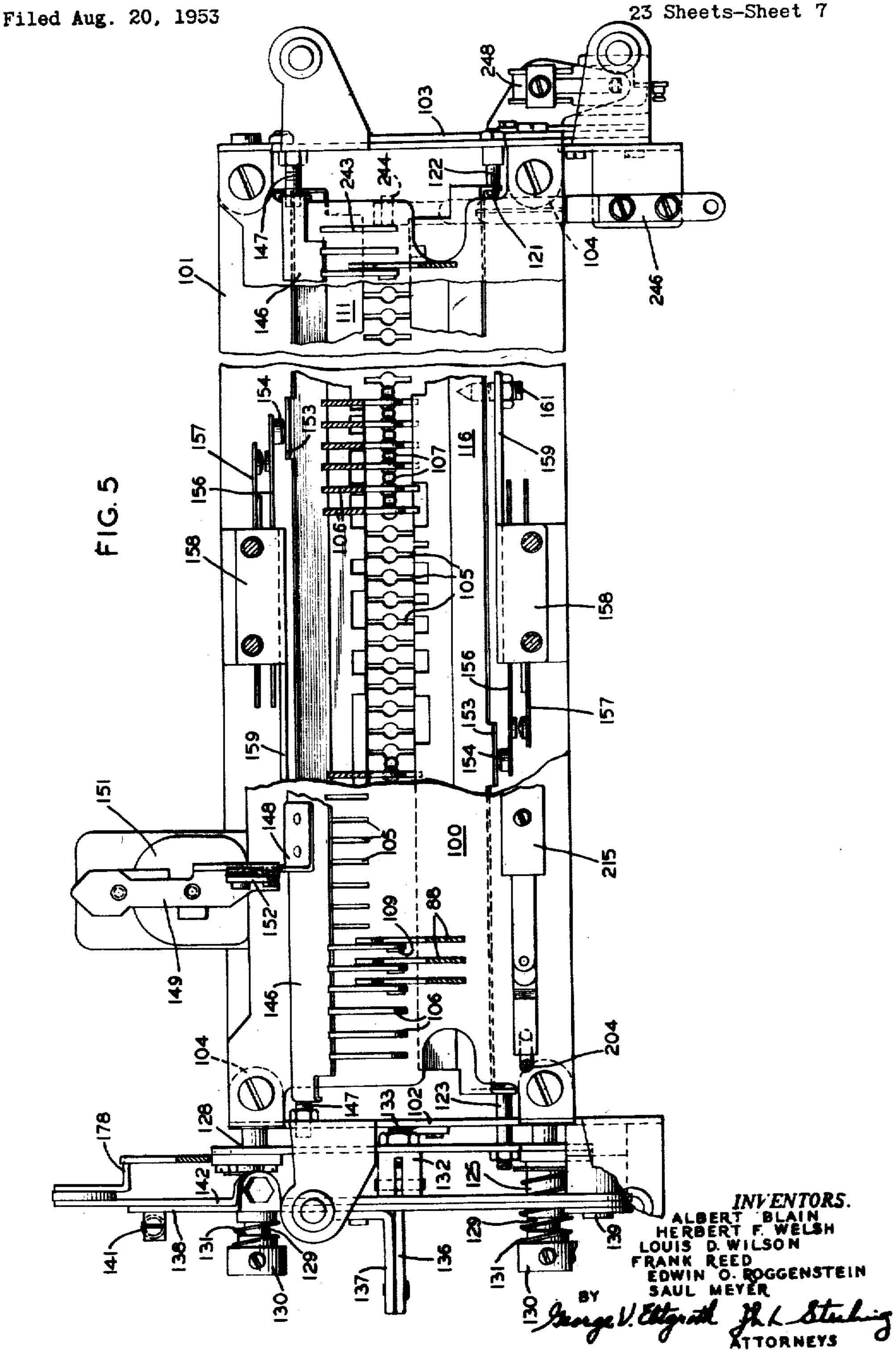
Fig. 5 is a plan view of the encoding unit that is secured beneath the machine, parts of the unit being broken away to show the interior structure.
Figure 6:
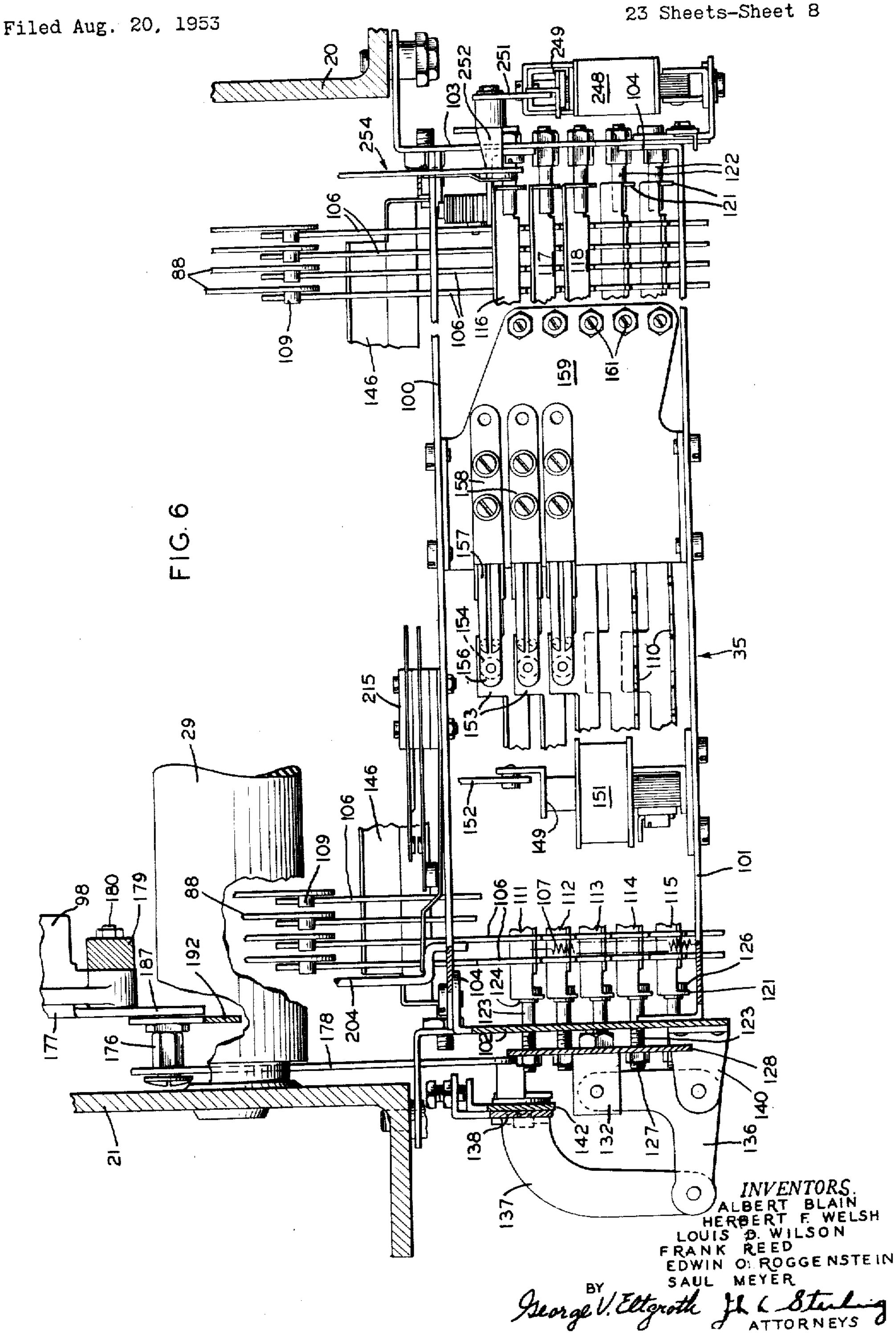
Fig. 6 is a view in elevation, partly in section, of the encoding unit shown in Fig. 5.
Figure 10A:
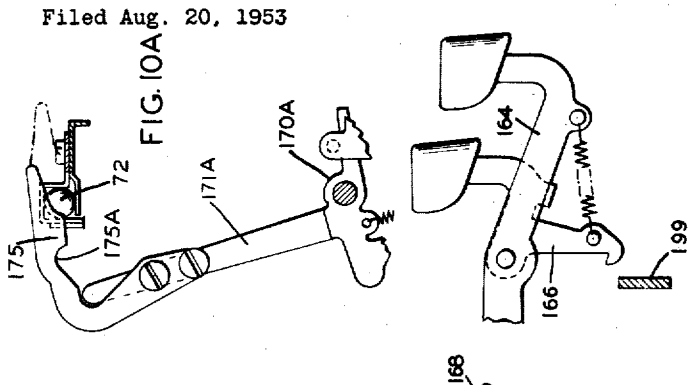
Fig. 10A is a modified form of shift key lock.
Figure 10:
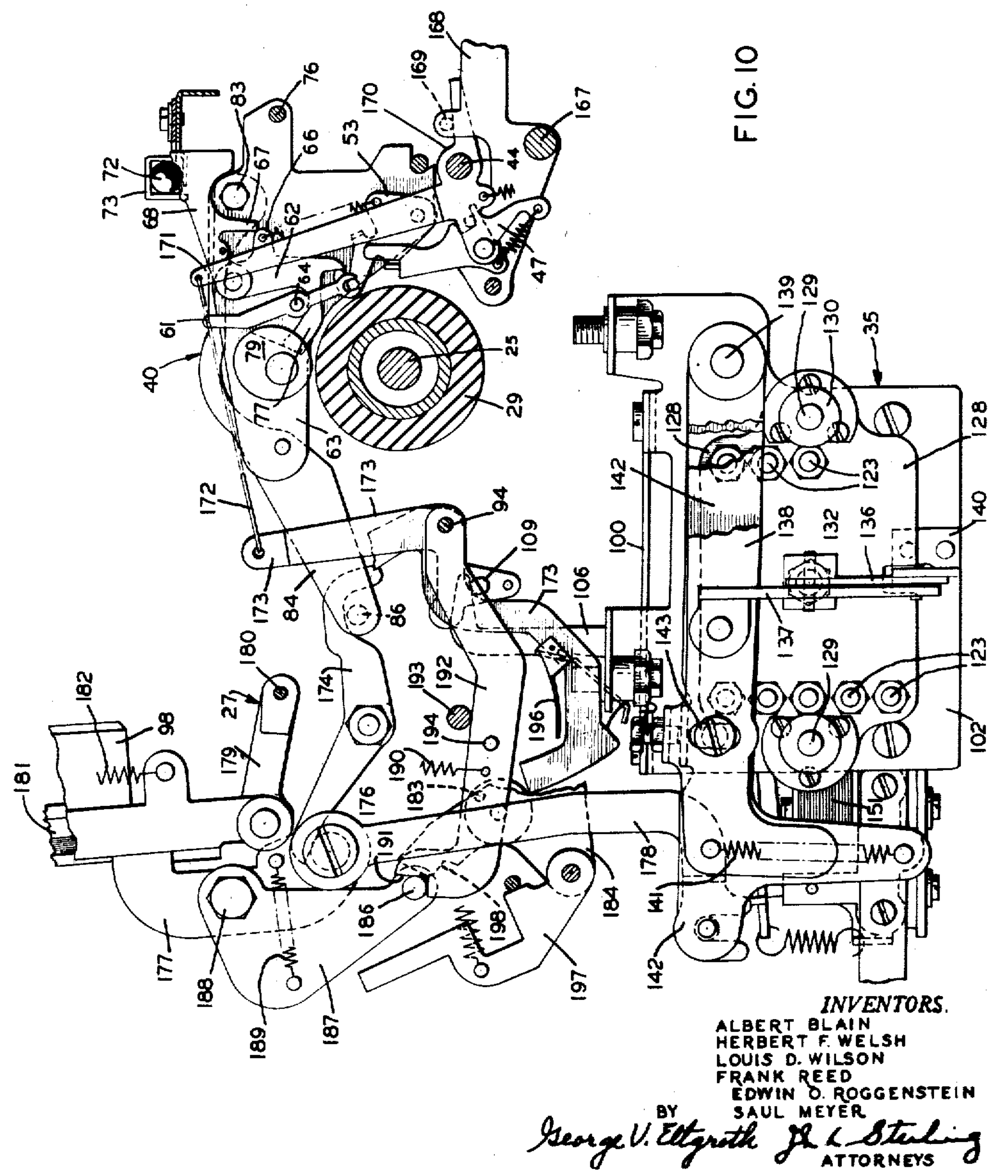
Fig. 10 is a view showing the case shift key and the operating parts associated therewith including the encoding unit.

The encoding unit 35, Figs. 1, 5, 6 and 10, suspended from the right and left side frames 20 and 21 of the writing machine includes upper and lower panels 100 and 101 respectively and end pieces 102 and 103 connected by suitable securing means through matching ears 104. The upper and lower panels each present a longitudinally extending row of slots 105 the slots of each panel being arranged to receive code keys 106 the upper ends of each of which hook over a stud 109 of a type bar bell crank 88 and are movable vertically to upper and lower positions against the resistance of springs 107 connecting each key with the lower panel 101. Each key (Fig. 15) along its opposite edges is shaped to provide lift projections 108 which underlie the inner edges of pivoted code strips the inner edge of each of which is differently serrated as at 110. The strips are arranged in flanking relation to the keys 106 and may be of any number on each side of the keys necessary to accommodate the code used. In the present instance five code strips 111, 112, 113, 114 and 115 are used at one edge of the keys 106 and three code strips 116, 117 and 118 are used at the opposite edges of the keys in order that an eight position code can be employed. The opposite ends of each strip are provided with ears 121 through which, at one end, extend studs 122 fixed in the end wall 103 of the frame and upon which studs the strips may have sliding and pivotal movement. At the other end, Fig. 6, the ears are attached to bolts 123 for pivotal movement only between a fixed disk 124 and the head 126 of each bolt. The bolts 123 pass through holes in the end piece 102 of the frame and are threaded as at 127 for longitudinal adjustment in a movable plate 128 so that all of the code strips can be closely adjusted lengthwise to bring the serrations into different relation with the code keys 106. The plate 128 Figs. 5 and 10 is mounted for sliding movement on pins 129 extending from the end panel 102 and carrying sleeves 125 which are adapted to abut collars 130 adjustable to limit the movements of said code strips to accurately position the serrated edges thereof with respect to the keys 106. The plate 128 also carries a clevis 132 which is secured thereto by a bolt 133. The plate 128 is moved by a bell crank 136 pivoted in a bracket 140 mounted on plate 102, the vertical arm of the bell crank being pivoted to the clevis. The bell crank is connected, through a link 137, with a lever arm 138 paralleling the end piece 102 and pivoted thereto by a pin 139. The lever arm 138 is spring connected as at 141 with an auxiliary lever 142 pivoted also on the pin 139 and having pin-in-a-slot connection 143 with the arm 138 for movement independently thereof when the plate 128 has been moved away from the end piece 102 to its limit as defined by contact of the sleeves 125 with the adjustable collars 130.

Figures 15, 15A:
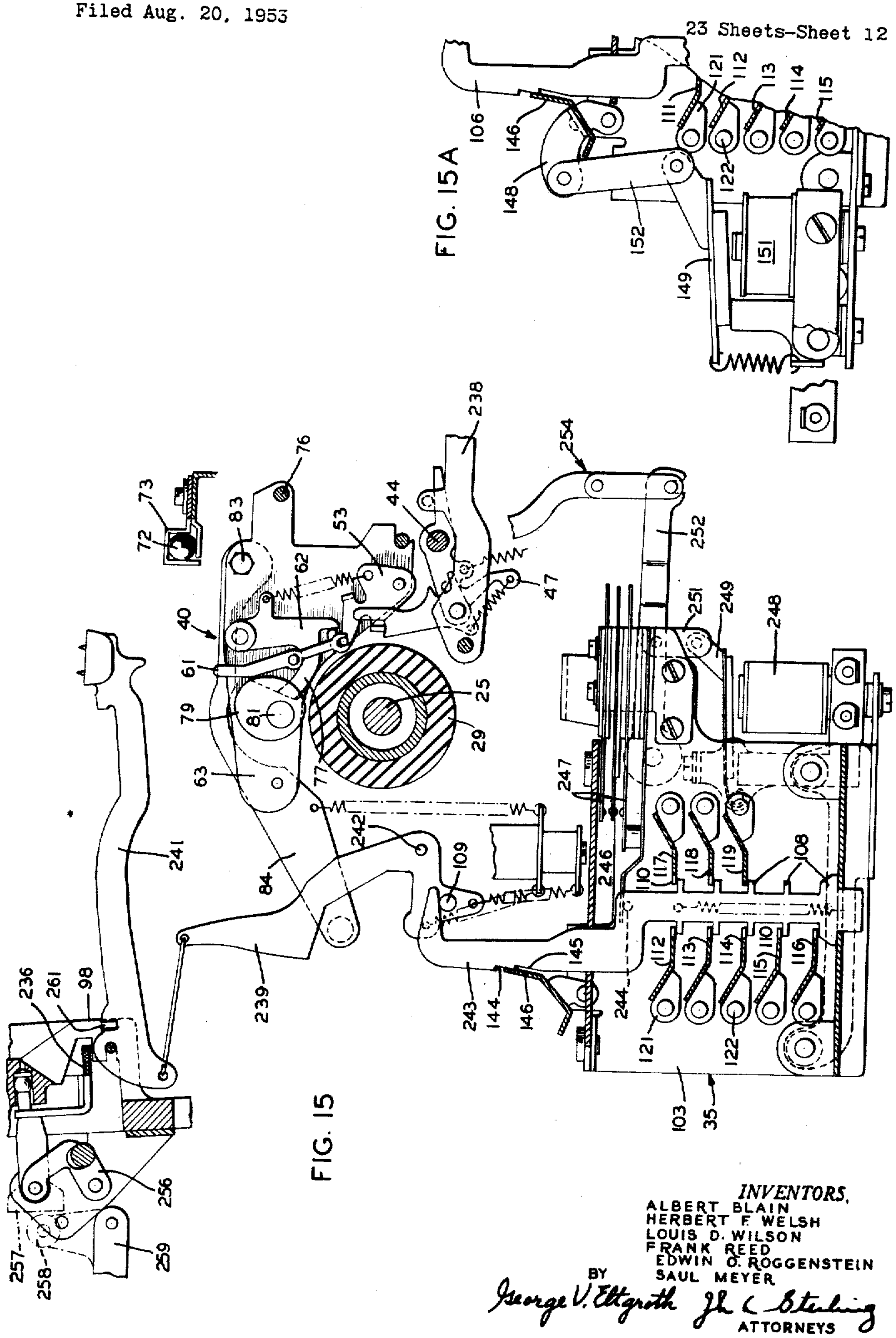
Fig. 15 is a side view of the trip key and its associated parts for controlling return of the carriage through part of the erase key mechanism without causing erasure.
Fig. 15A is a fragmentary portion of Fig. 15 showing a code key latching bail and actuating means therefor.

In one edge of those portions of the code keys 106 that extend above the top panel 100 of the encoding unit 35, Figs. 15 and 15A, vertically spaced notches 144 and 145 are formed for engagement by the upper edge of a detent latch bail 146, common to all of said keys and pivotally mounted with respect to the end pieces 102, 103 as at 147. The latch bail 146 carries a bracket 148 connected to the armature 149 of an electromagnet 151 through a link 152 so that operation of the bail to release the code key and strips that have been "set" can be controlled electrically. Each code strip is provided with a vertically disposed tab 153 which is engaged by the insulated end 154 of a yieldable arm 156 normally spaced from a contact finger 157, the arm and finger constituting a switch unit 158 (Figs. 5 and 6) included in a code circuit shown in Fig. 43.

A plurality of said units 158 are mounted at opposite sides of the encoding unit on switch panels 159 from which extend threaded studs 161 for adjustable engagement with the underside of each code strip to limit the downward movement of the latter with respect to the lift projections 108 of the code keys 106. The studs also prevent the serrated edge of the code strips from catching on the code keys when said strips are moved endwise when case shift occurs.

In the conventional typewriter the keyboard displays the upper case letters and shift of the carriage or type basket brings into register with the printing point on the platen the upper or lower portions of the type heads for typing, which constitutes the commonly referred to "case shift." Because of the large number of characters to be handled in the present machine without departing from the standard key bank arrangement, and because some small letters of the alphabet are employed as symbols, the keyboard Fig. 4 displays in upper case position symbolic small letters, numerals and symbols, and displays in lower case position capital letters, numerals and symbols or signs. In the present instance for convenience of description, reference is made to upper and lower case although the capital or upper case letters which have only an alphabetic connotation herein are shown on the keyboard in the lower case position. For instance, the key button for Q shows the capital letter in lower case position on the keyboard and the small t in upper case position. On the type head 90 the Q will be in the low position and will print the capital on the record sheet if the shift key is not operated. If the shift key is operated the type segment 98 is moved down so that the small t which is in the upper position on the type head will be printed. The Q is used alphabetically and the t is used symbolically. Consequently when reference is made herein to upper or lower case or position it means printing on the record sheet the letters, numerals, or symbols that occupy the upper or lower positions on the type bars and the corresponding positions on the key buttons of the keyboard. Where the upper case position on the key button is blank, the type will be identical in the upper and lower case positions on the type head 90. The matter printed on a record sheet on the platen is encoded and induced on a magnetic tape, which for use in the electronic computer must be without blank spaces except between blockettes of information and every operation of the machine must be printed on the record sheet in symbol form and entered on the tape in encoded form. For this reason the delta key which symbolizes a space is actuated by an overlying lip formed on the key shank 162 of the space bar 163 of the keyboard. A section of the keyboard is in colored contrast to the rest of the keys, the numerals on the keys 160 in the colored section, being arranged in accordance with the standard arrangement of keys in a card punch so that an operator, skilled in the use of punched card equipment, can use these keys with one hand to more rapidly enter numerical data as is done in ten key machines.

Figure 11:
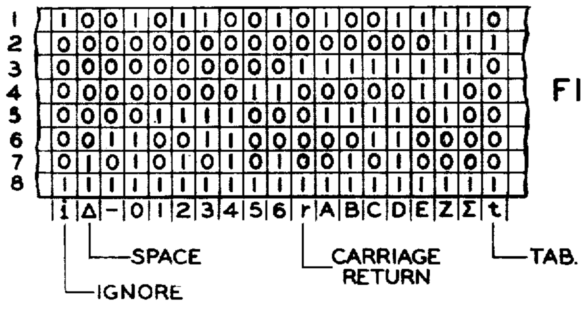
Fig. 11 is a fragmentary portion of a chart showing the code according to which the code strips are shaped and the tape magnetized.
Figure 12:
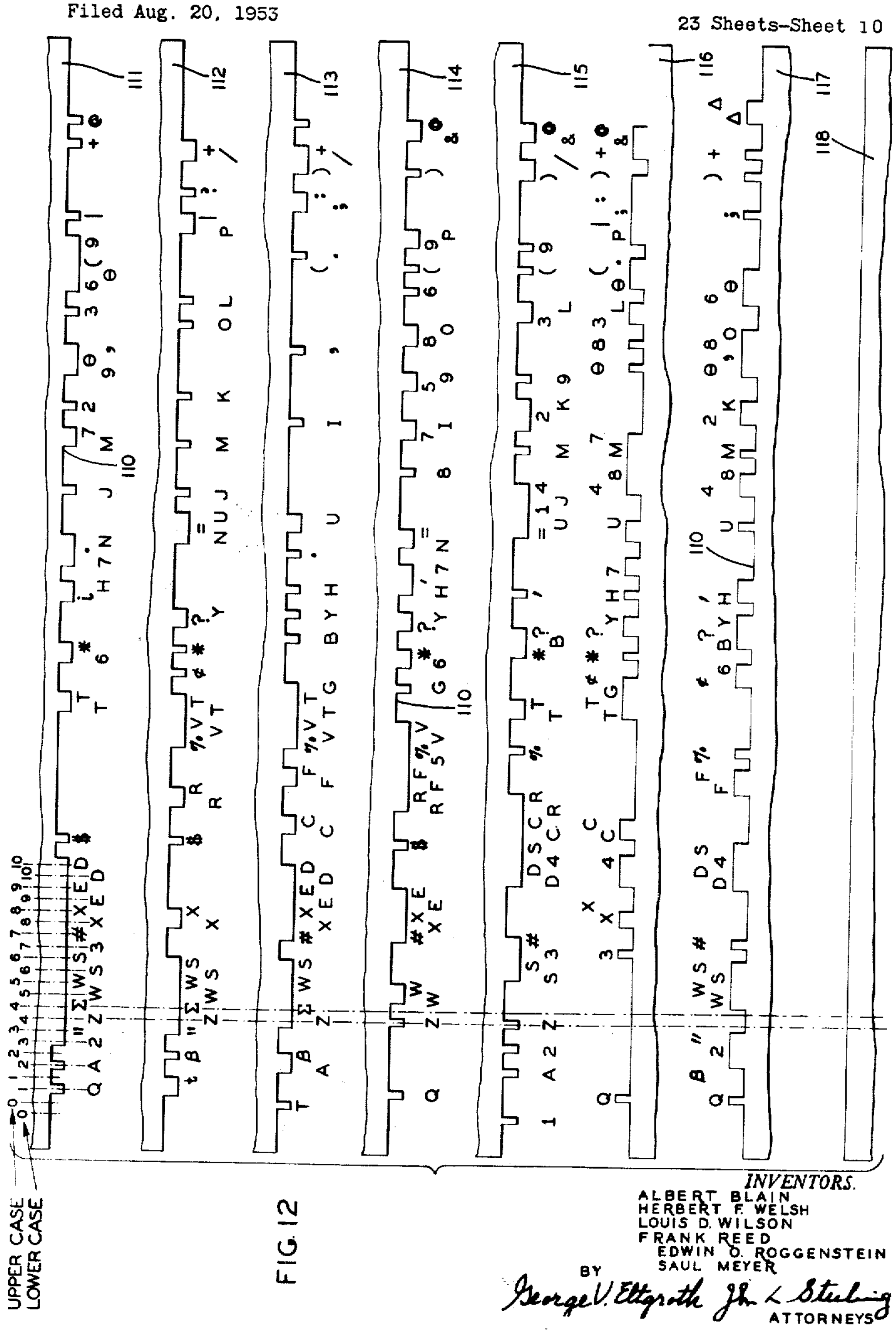
Fig. 12 is a diagrammatic view of the edges of each of the code strips used in the encoding unit.

From the code chart shown in Fig. 11 and the diagrammatic representations of the code serrations 110 in the edges of the various code strips, Fig. 12, it will be evident that for the letter Z the code strips 116 and 117 will be notched out, the absence of a notch being indicated by the "1" and the presence of a notch being indicated by "0," this chart identification conforming to the binary symbols of notation. The code strips 111, 112, 113, 114, 115 and 118 not being notched out, will be rocked by the projections 108 on the code key 106 which is lifted by the bell crank 88 of the Z key lever power mechanism 40 to close the related switch units 158. When the shift key 164 is operated all of the code strips are moved to the upper case position and the strips 111, 112, 113 and 118, being without notches in the areas thereof in register with the projections on the code key corresponding to the key designated "sigma" and "Z" (Fig. 4) are rocked to operate their respective switch units 158.

Case shift is accomplished either by moving the platen relatively to the type unit or moving the type unit relatively to the platen and while in this instance the type bar segment is shifted it is understood that operation of the encoding unit is also contemplated from the platen shift mechanism in machines using this method of case shift. Shift of the type and the encoding unit 35, Fig. 10, is by operation of either of the shift keys 164, at opposite sides of the keyboard, each carrying the usual shift locks 166 and being connected by the rod 167. The extension 168 of the shift key, at the left of the keyboard, carries a stud 169 for rocking a bell crank 170 whose arm 171 is connected by a pull wire 172 with the upper end of a shift bell crank 173 pivoted on the fulcrum rod 94. The operation of the power mechanism, including the lift pawl 47, power trip lever 53, roller trip arm 61, roller detent 62, power arm 63, key lock lever 68, cam roller 79 and the power arm extension 84, is the same as previously described in connection with the key levers 38. When the extension 84 is lifted, through the action of the power roll 29, it rocks through its roller 86, a power shift lever 174 which pushes down on a stud 176. The latter is carried in a segment bracket 177 and pivotally supports the upper end of an encoding shift link 178 whose lower end is secured in the outer end of the auxiliary lever 142 which, as above described, moves the plate 128 to shift the code strips endwise.

In order to prevent operation of any key having a ball lock arm 68 a modified construction of the shift key structure is shown in Fig. 10A wherein the upper end of arm 171A of the bell crank 170A carries a ball lock engaging plate 175 having an opening 175A which is arranged to allow movement of the balls of the ball lock when the shift has operated. While shifting in either direction is in progress, the solid portion of the plate, acting like any of the other ball lock arms 68, will prevent operation of any other key mechanism.

The type bar segment 98 is pivoted to a segment shift rocker 179 pivoted as at 180 and said segment has vertical sliding movement in the usual ball raceways of a segment mounting 181 which is secured to and extends between the side frames 20 and 21. The segment is yieldably held in raised position by suitable side springs 182 which connect the segment with said mounting and against the resistance of which the segment is pushed down by the rocking action of the shift lever 174. Before the latter is actuated, the shift bell crank 173 at its free end pushes against a roller 183 carried on a pivoted shift latch 184 to swing the latter counterclockwise against a pin 186 carried on the lower free end of a shift catch plate 187 pivoted as at 188 to the segment bracket 177. The pin 186 is maintained by a spring 189 in the shoulder 191 of a detent arm 192 which is urged by spring 190 to raised position against a stud 193 and from the shoulder of which the pin 186 is pushed by the counterclockwise movement of the shift latch 184. The arm 192 has a pin 194 engaged by a buffer leaf spring 196 on the shift bell crank 173 when the latter is moved to dislodge the pin 186 and cause it to ride down between the opposed edges of the detent arm 192 and a pivoted, spring biased guide 197 as the segment 98 moves down under influence of the shift lever 174. The continued swinging movement of the shift latch 184 will cause a notch 198 thereof to catch over the pin 186 and hold the segment down so that the characters in the upper case position can be typed and encoded in the unit 35 as long as the shift key is latched down by engagement of the shift lock 166 with the latch bar 199. In the operation of the power trip mechanism when the shift key 164 is mechanically latched down or is held down manually and shift has occurred, the lift pawl 47 will be held up, as shown in Fig. 1 in outline position, so that the shoulder 51 is above the tab 53 preventing further operation of the parts. When the splay end 71 of the key lock lever 68 has dropped out from between the balls operation of another key lever 38 is possible. The spring 190 augments the action of spring 182 in supporting the segment in raised position through the catch plate 187 and when the pin 186 is pushed off the shoulder the shift lever 174 does not have to operate against the resistance of spring 190.

The movement of the carriage 24 controls the operation of a tape unit 200 through the escapement mechanism 26, the escapement shaft 232 of which has attached thereto a double faced make and break disk 201. The opposite faces of the disk switch are engaged by contact brush arms to control circuits including a tape contact magnetic head 205 which forms part of the tape unit and is fully shown and explained in the patent to J. P. Eckert, Jr. et al., 2,618,709, dated November 18, 1952 and Patent 2,625,607 to J. P. Eckert, Jr. et al., dated February 13, 1953.

*Backspace mechanism*

Figures 13, 14:
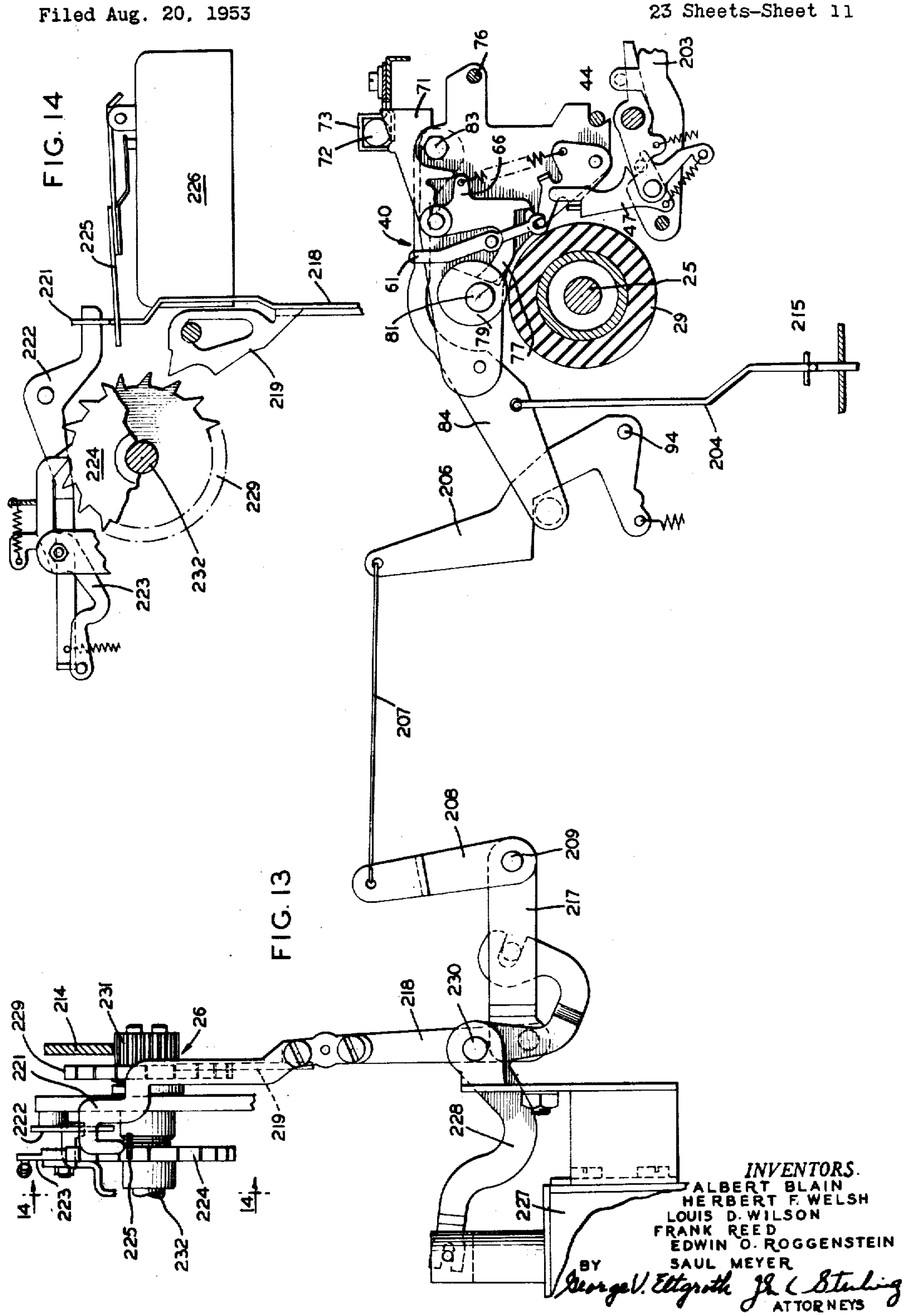
Fig. 13 is a view showing the back spacing mechanism and its control from the back space key lever.
Fig. 14 is a side view of that part of the escapement operated by the backspacing mechanism.

The mechanism for backspacing the carriage is automatically supplemented in its operation to compensate for the extra-load imposed on the carriage and its escapement, by the tape unit. As seen in Figs. 13 and 14, a backspace key 202, bearing an arrow on the key button thereof, through a key lever 203, initiates operation of its related power mechanism 40. The operation of the power roll 29 causes a lifting of the power arm extension 84 of the mechanism 40 to lift a switch rod 204, to swing a backspace bell crank 206 clockwise about its pivot, to pull on a tie rod 207 and swing a rock arm 208. The latter is fixed to a rock shaft 209 pivoted in the spaced ears of a U-shaped bracket 210 mounted on one of the frame plates 211 between which the spring drum 212 is pivoted. The latter is connected by a flexible strip or belt 213, Figs. 2 and 2A, to one end of a carriage feed rack 214, as at 216, to provide a yieldable resistance to movement of the carriage 22, in backspace direction, which movement is controlled by the escapement mechanism 26. The rock shaft 209 has fixed thereto a booster link 217 whose free end is pivoted to a lift link 218 carrying at its upper end a backspacing dog 219 and a detent control arm 221. The end of the latter overlies the short end of a detent lever 222, the spring tensioned end of whose long arm is extended laterally to rest on top of one end of a pawl detent 223 yieldably maintained in contact with the teeth of a detent wheel 224. The extreme depending tip of the control arm 221, where it overlies the lever 222, is adapted to hold down a switch arm 225 to condition a backspace pawl switch 226 to momentarily open a ground circuit as will be later explained. The rod 204 when raised closes a solenoid switch 214 (Figs. 6, 13, and 43) to complete a circuit including a solenoid 227. The core of the latter, through a solenoid lever 228 pivoted as at 230 to a bracket assists in raising the lift link 218 through its connection to the booster link 217 when the rod 204 operates the switch 215 to complete the solenoid circuit before the dog 219 engages the teeth of an escapement wheel 229. The latter, with the detent wheel 224 and a carriage feed rack ratchet pinion 231, is fixed to an escapement shaft 232. In this machine, the manual control for moving the carriage independently of the escapement mechanism is omitted because the carriage is operatively connected with the tape panel or carrier as will be later explained. The escapement mechanism Figs. 1, 1a and 19, for controlling the feed of the carriage in typing includes the escapement wheel 229, pivoted and fixed dogs 233 and 234 respectively, dog rocker 235 and universal bar 236 for operation of the escapement under influence of the type bars 91 in the well known manner. The detent wheel 224 and its dog 223 coact with the escapement to take up back-lash between the parts, stop the carriage accurately in position and provide a positive lock for the carriage so that it cannot be moved manually.

*Carriage return and erase*

Figure 2:
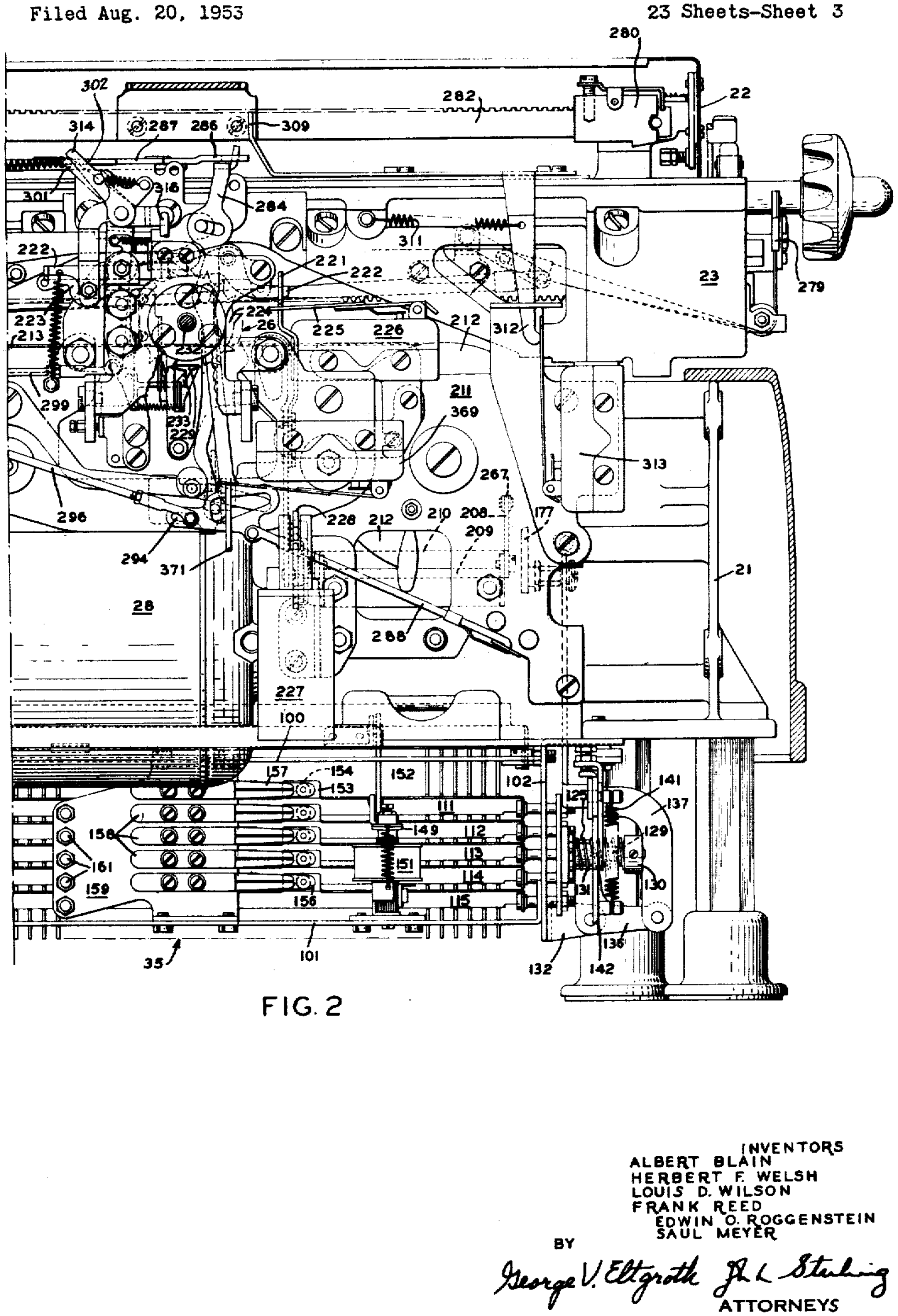
Figure 2A:
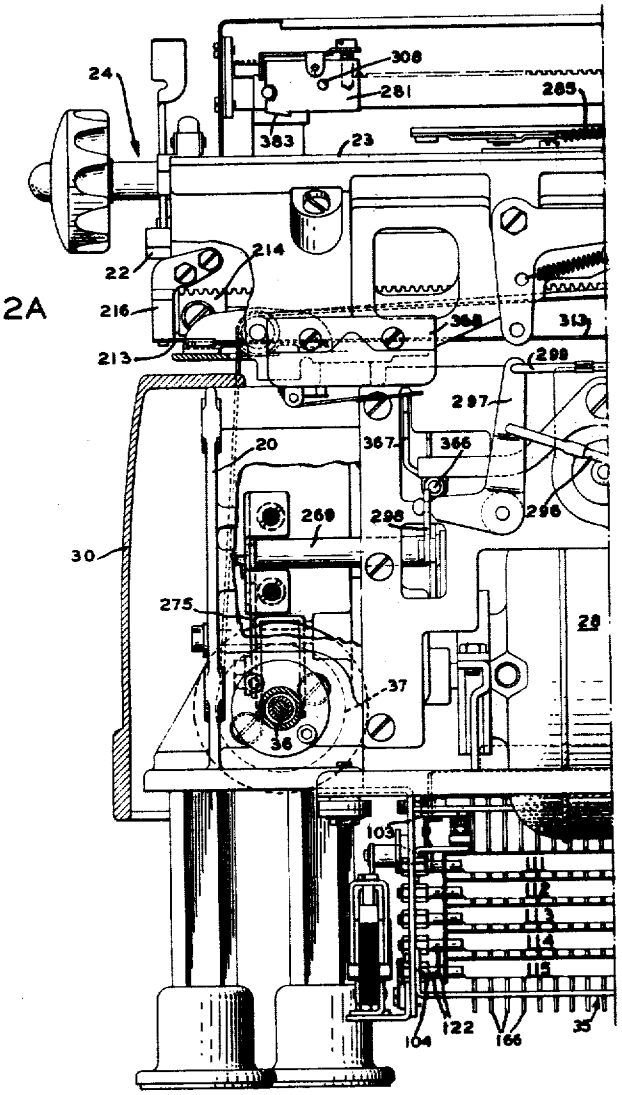
Figures 16, 19:
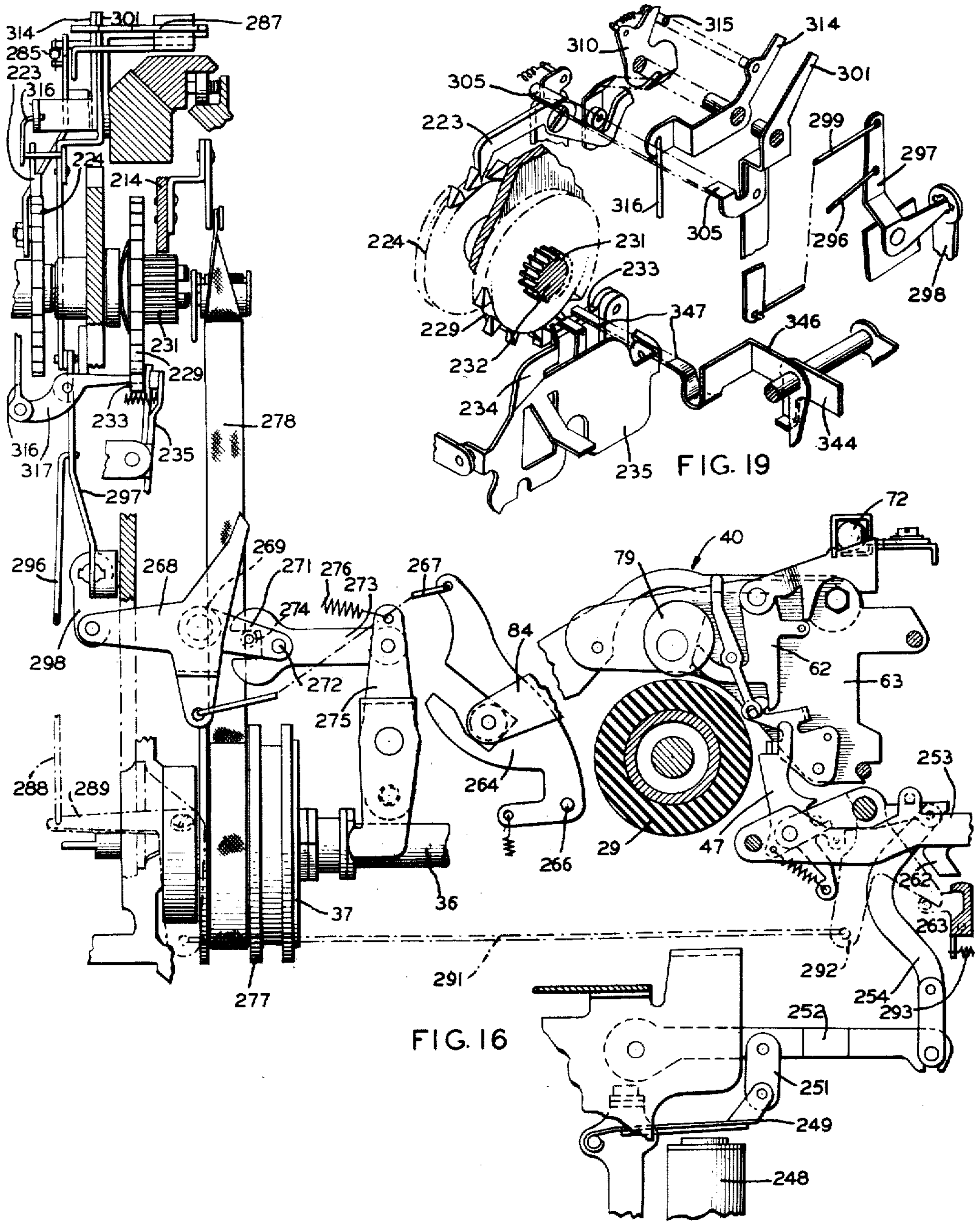
Fig. 16 is a side view of the erase key which returns the carriage to line starting position and also controls an erasing circuit.
Fig. 19 is a view in perspective of part of the escapement mechanism.

One line of typed data and its corresponding entry on the tape by the recording head 205 is considered as a "blockette" a fixed number of these being considered as a block of data. The data in one "blockette" consists of one hundred and twenty characters without any spaces therebetween and it is evident that the operations of the tape, the recording head and the carriage must be closely coordinated. The return of the carriage can occur with or without erasing action in connection with the data that has been magnetically induced in the tape by the head 205. The return of the carriage in one or more movements in backspacing always accomplishes erasing. For returning the carriage when erasure of the line of data entered is desired, an "Erase" key 237, which functions as a carriage return key, is operated. For return of the carriage, without erasing, a "Trip" key 238 is operated. The latter, as shown in Fig. 15, is operatively connected, through its key lever mechanism 40, with a trip bell crank 239 to actuate a type bar 241 to print an underline beneath the space that immediately follows the last character typed in a blockette. The bell crank 239 swings on its pivot 242 to lift an encoding unit code key 243 so that a pin 244 thereon will raise the arm of a Trip Switch 246 to bring together normally separated contacts 247 to close a circuit and energize an electromagnet 248 Fig. 16. Operation of an armature 249 by the energized magnet 248 will, through a link 251, swing a lever 252 counterclockwise to actuate a combination erase and carriage return key lever 253 of the "Erase" key 237 through a linkage 254. Use is made of a permanent magnet serving as an erasing head 255 which clears the tape before it reaches the recording head by providing a magnet field corresponding to the magnetic field of the recording head 205 that is used in "erasing." Normally during typing each type bar, except 241, associated with the trip key 238, pushes the universal bar 236 to operate the carriage escapement through a rocker 256 mounted on the segment 98. The rocker 256 has a tab end 257 for engagement with a roller 258 carried on one end of an escapement operating bail 259. The trip key type bar 241 is notched as at 261 to prevent operation of the universal bar 236 thereby. Each of the key levers, Fig. 1, carries a lock pawl 262 which may engage the upper edge of a key or line lock bar 263 underlying the key levers and pivoted in the side frames for adjustment to plural positions to prevent operation of the keys when a line of typing has been completed or when other operating factors of the machine make necessary the locking of the keys against operation. In typewriter nomenclature the key lock device is called a line lock and its use herein will indicate locking of the keys from any source. When the carriage is to be returned without erasing the data magnetized in the tape the trip key 238 is operated, but when the data of a line or of part of a line magnetized is to be erased, the key 237 designated "Erase" is operated and, through the power actuated key lever mechanism 40 associated with the combination key lever 253, swings a bell crank 264 about its pivot 266 (Fig. 16). The bell crank is connected by a wire link 267 with one of the arms of a trifurcate lever 268 which is formed integrally with a rocker sleeve 269 having a unitary toggle arm 271 pivoted as at 272 to a toggle link 273 whose recessed end defines the throw of a limit pin 274 carried in said arm 271. The end of link 273 is pivoted to a clutch lever 275 for operatively engaging the parts of the clutch 37 against the resistance of a spring 276. In one position the toggle remains "set" and in another position it remains "broken." When it is "set" by operation of bell crank 264, the power from shaft 36 causes a drum 277 to reel in a belt 278, Figs. 3 and 16, whose end is connected to the carriage 22 through the usual line space mechanism indicated generally by the numeral 279 (Fig. 2).

The length of a line of typing includes a predetermined number of characters constituting a "blockette" on the magnetic tape and is determined by the positions of a left hand margin stop 280 and a right hand margin stop 281 both of which are fixed to a margin stop rack 282 secured on the carriage and cannot be adjusted by the typist. When the last character has been printed the toe 283 of the right margin stop 281 (Figs. 2 and 2A) will engage the upper end of a margin rock link 284 which extends through an elongated slot 286 in the end of a toggle release slide 287 tensioned by a spring 285, to swing said link and pull on a line lock rod 288 to rock the line lock bar 263 and prevent further operation of all of the keys except the trip, erase and backspace keys. The rod 288 (Figs. 16 and 41) swings a bell crank 289, which in turn, through a tie link 291 rocks a line lock bell crank 292 to rock the line lock bar 263 against the resistance of a spring 293. A slot 294 (Fig. 2) in the lower end of the margin link 284 permits operation of the line lock rod 288 independently of a pull link 296 actuated by a bell crank 297 connected to the trifurcate lever 268 by a link 298.

The upper end of the bell crank 297 (Figs. 2 and 19) is connected by a tie rod 299 with a trip lever 301 whose upper end is positioned against a bevelled cam edge 302 on the toggle release slide 287 when the toggle is "set" by operation of the erase or carriage return key 237. The slot 294 in link 284 permits operation of the line lock bar 263 without disturbing the bell crank 297. When, however, the key 237 is operated somewhere during the line of typing as where a mistake has been made and the operator wishes to erase from the tape the previously entered matter the operation of setting the toggle will rock the bell crank 297 counterclockwise and through the link 296 will swing the margin link 284 to operate the line lock bar 263. This is possible because when the bar 263 is in its inoperative position the end of link 296 is in the left end of the slot 294. In Fig. 2 the lock rod 288 is in the position it occupies when the line lock bar 263 is in key locking position as shown in Fig. 1 because the electric starting switch that controls the operation of the machine is in the "off" position and the bar 263 is in the key locking position when the motor 28 is not operating. The line lock bar 263 is normally held in key locking position by the spring 293 against the resistance of a spring 300 which connects the armature 303 of an electromagnetic line lock 304 which is energized during typing to tension the spring 300 and swing the line lock bar 263 to permit operation of the keys. The actuator is de-energized during rewinding and loading operations of the tape unit as will be later explained, to lock the keys. The actuator is supported on a bracket 306 mounted on a cross bar 307. When the carriage reaches the end of its movement in letter space direction, a pin 308 (Figs. 2 and 2A) on the right hand margin stop 281 engages the vertical portion of a switch slide 309, mounted on top of the carriage runway 23 for yieldable movement against the action of a spring 311, to cause a switch arm 312 thereon to actuate a circuit controlling right margin switch 313. When the carriage 22 is being returned to the starting point of the line the toggle 271 is in operative position and the trip lever 301 is against the cam edge 302. In order to move the lever 301 and break the toggle, the carriage must move beyond the margin point in order to operate the release slide and in order that the escapement may permit movement of the carriage in reverse direction back to the overrun margin point an escapement release lever 314 (Fig. 19) is arranged to be actuated by the cam edge 302 of slide 287. The lever 314 acts through a pull rod 316 and a finger lever 317 (Fig. 16) to depress the pivoted dog 233 to clear the escapement wheel so that the carriage may have a letter space movement to the left margin position.

When the trip key is pressed for carriage return the trip lever 301, through its connections 297 and 299 with the toggle operating mechanism (Figs. 2, 16 and 19) swings an extension 305 thereon to lift and hold the pawl detent 223 away from the detent wheel 224. The lever 301 is held against the cam edge 302 during carriage return by the "set" condition of the toggle mechanism. The return force of the carriage is absorbed by the yieldable resistance of spring 285 of the release slide 287 which latter kicks the lever 301 to break the toggle and free the pawl 223 for wheel engaging movement when the toe 383A of stop 280 (Fig. 2) moves slide 287 through 284. The movement of the escapement release lever 314 will, through a pin 315, rock a roller arm 310 to keep the pawl 223 out of engagement with the wheel to prevent breakage of the teeth. The carriage in settling back, due to the resistance of the spring pressed slide, will relieve pressure on the lever 314 and let the pawl 223 fall into place in front of the proper tooth of the escapement mechanism as the carriage comes to rest.

*Tabulating mechanism*

Figure 18:
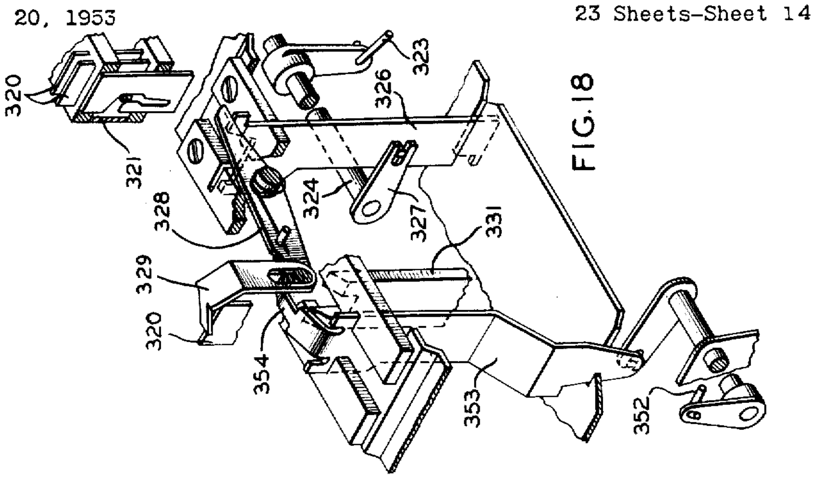
Fig. 18 is a view in perspective showing part of the tabulator setting and restoring mechanism.
Figure 17:
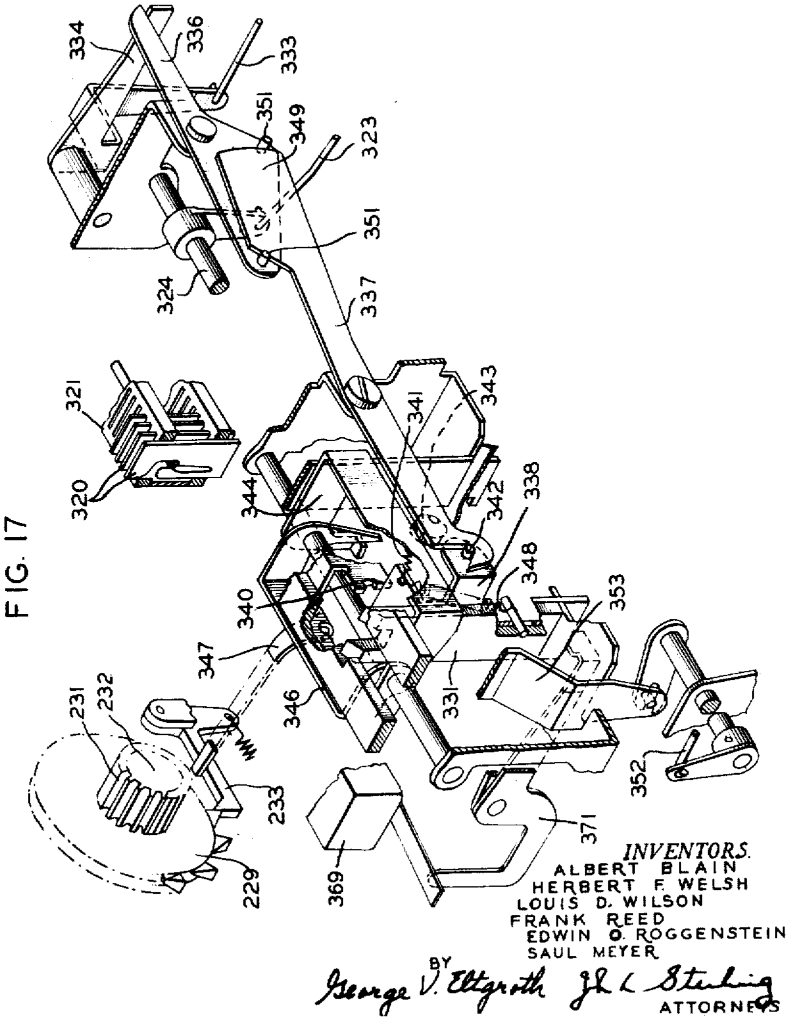
Fig. 17 is a view in perspective of part of the tabulating mechanism.
Figure 21:
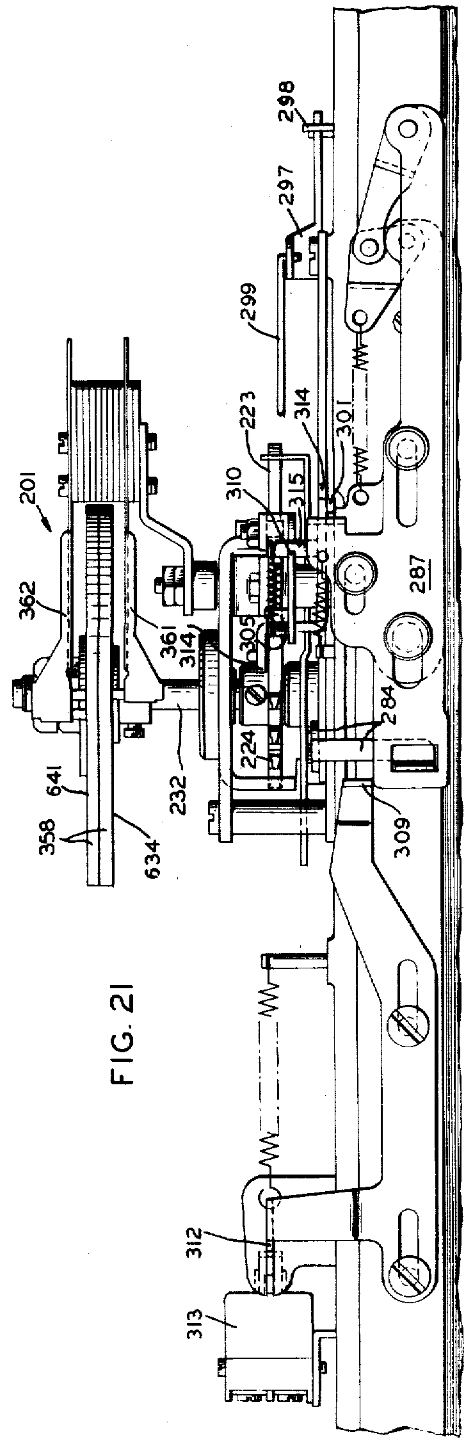
Fig. 21 is a plan view of part of the rear of the machine, without the tape unit, showing the relative positions of the escapement mechanism and the disk switch.

The tabulating means have been separated for illustration, the one in Fig. 17 being the tabulator stop carrier, escapement release and carriage arresting mechanism while the one in Fig. 18 is the stop setting and restoring mechanism. The carriage position stops 320 are mounted in a stop bar 321 fixed to an under portion of the carriage and overlying the stop setting, stop restoring and carriage arresting stop mechanisms. Through the operation of a tabulator setting key 322 (Fig. 20) a rod 323 rocks a shaft 324 to raise a lift bar 326 through an arm 327. The upper toed end of the bar 326 swings a lever 328 to pull down a finger 329 which pushes any stop 320, beneath it, down so that it will engage a carriage arresting stop 331 when the latter is raised. This occurs when the operator presses the tabulator key 332 on the keyboard and the power mechanism pulls on a rod 333 to raise the free end of a bell crank 334 and rock interlinking levers 336 and 337 to lift a bracket 338 to which the carriage arresting stop 331 is attached. The bracket extends through a frame plate, is urged at its upper end into contact with a notched keeper 340 by a spring 341 and has an ear bearing pin 342 which is lifted by the end of the interlinking lever 337. As the latter rises, a roller 343 engaging the under edge of a bail 344, lifts the latter to rock a coacting bail 346 down so that an arm 347 thereon frees the loose dog 233 from the escapement wheel 229 and lets the carriage move in letter space or tabulating direction until a depressed stop 320 engages the carriage arresting stop 331.

During the tabulating movement of the carriage, the stop 331 has been held in raised position by engagement of the bracket with the notch in the keeper 340 and the arm 347 has held the pivoted dog free of the escapement wheel. When a set stop 320 strikes the arresting stop 331 the latter is moved to push the bracket out of the notch in the keeper and the stop 331 is returned to its ineffective or lowered position by the combined actions of the springs 341 and 348. This action, through pin 342, rocks the lever 337 counterclockwise and the cam end 349 on said lever, coacting with pins 351 on the lever 336, restores the latter for subsequent operation. The set stops 320 are restored to ineffective position by manual manipulation of a restoring or tabulator clearing key 350 at the front of the machine which pulls on a rod 352 to raise a restoring bar 353 whose cam tail 354 wipes the depressed stops as the carriage moves in tabulator stop clearing action.

Figure 20:
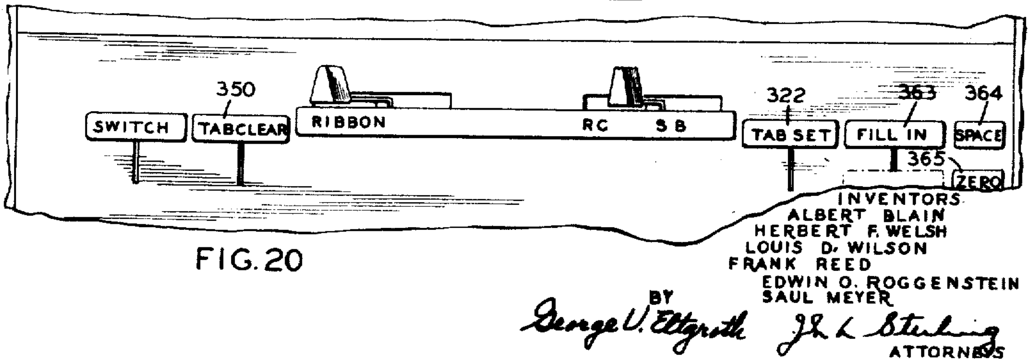
Fig. 20 is a fragmentary view of the front of the machine showing the tabulator control keys.

When the carriage moves in tabulating action, the magnetic tape has marks corresponding to a "zero" or to a "space" induced therein as selected by the typist. In Fig. 20 a key 363 designated "Fill In" registers with a "space" indicator 364 and when pushed down for register with a "zero" indicator 365 will, through a pull rod 366 rock a bell crank 367 to control a "Fill" switch 368. As will be explained in connection with the operating circuit, the "Fill" switch may be used in conjunction with a "Tabulator" switch 369 which is controlled by the movement of a lever 371 (Figs. 1–2A) whose inner end underlies the lower edge of the carriage arresting stop 331 (Fig. 17), which is operated as explained from the tabulator key 332.

Figure 23:
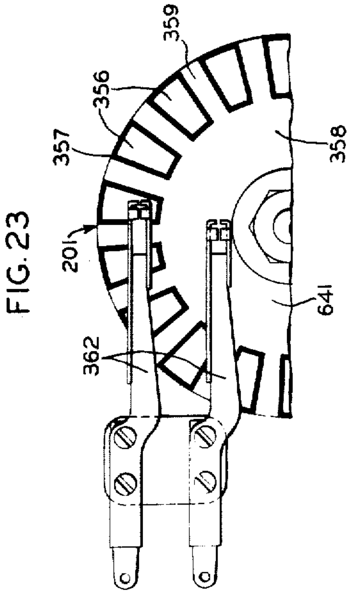
Figs. 22 and 23 are views in elevation of the upper half of the reverse faces of the disk switch.
Figure 22:
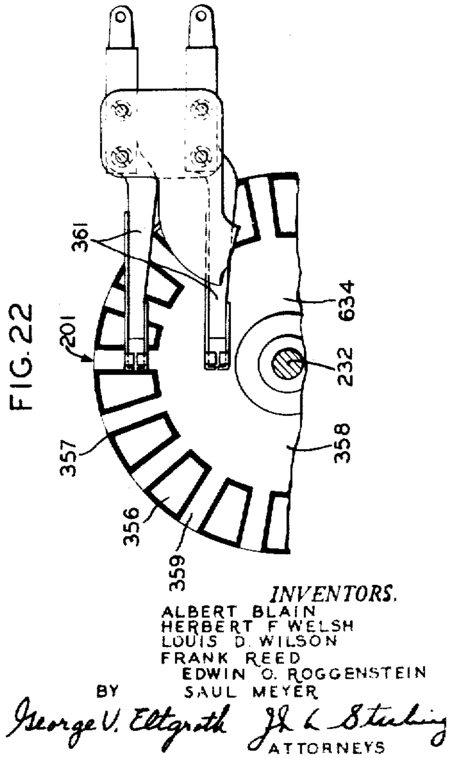

The movement of the carriage in either direction revolves the escapement shaft 232 (Fig. 1A) through the rack 214 and pinion 231, and causes revolving movement of the disk switch 201. The latter may be made of two separate disks secured together as shown in Fig. 1A or may be made as a single disk. In either instance the opposite faces will have segmental delineations 356 spaced by areas 357 of the insulating material of which the disk is made, and circular band surfaces or zones 358 having radially portions 359 extending between the areas 357. The areas 356, 358 and 359 are of any electrical conducting substance sprayed on or otherwise applied to the surfaces of the disk. The opposite sides of the disk, referred to for convenience as the inside and outside faces, are each engaged by a pair of contact brush arms 361 and 362 respectively, which are supported by a suitable bracket from the frame of the typewriter and are included in a circuit to be explained hereinafter. The brushes 361 in Fig. 22 are in circuit completing relation with the conducting areas 358, 359 of the face of the inside disk while the brushes 362 in Fig. 23, which have a slight "lead" over the brushes 361, are in circuit interrupting relation with a segment 356 and the area 358. The segments 356 while they do not function to complete a circuit are made of the same material as the circuit completing areas so that chatter of the brushes will be eliminated by providing metal to metal travel relation between the disk and the brushes. A difference of material of the segments and intervening areas would produce a different coefficient of friction resulting in brush chatter which is objectionable.

The wires from the various switches and electrically operated parts of the typewriter terminate in a socket 372 (Fig. 1A) mounted in a bracket 373 beneath the typewriter, for receiving a multi-prong plug 374 clamped to the end of a conduit 376 leading to a power unit 377. The latter is also connected by wires 378 to the recording head of the tape unit and the control members of the typewriter.

*The tape unit*

The data that is typed to provide a visible record is encoded, and, through the recording head 205, is entered on a magnetic record tape carried by the tape unit 200. This tape on a supply reel is placed in the unit and has its free end detachably secured to one end of a lead strip whose opposite end is fixed to a storage reel. The cover of the unit must be closed before a pull on a handle causes a drive roller to operate a capstan and feed the lead strip to the storage reel until the record tape is in register with the recording head in what is designated as a "loading" operation. The drive roller is then moved automatically to a "neutral" position and the typewriter operation, through movement of a capstan driving belt, connected to the carriage 22 by an adjustable clamp, controls the feed of the tape in recording and erasing operations. After the recording is completed the handle is pulled and the drive roller operates the capstan to run the tape back off the storage reel onto the supply reel in an operation designated as "rewind." The termination of this operation is automatically detected and after the parts are moved to a "neutral" position the cover can be opened for replacement of the reel of recorded tape. A detailed description of the mechanism and operation will follow.

Figures 27, 28:
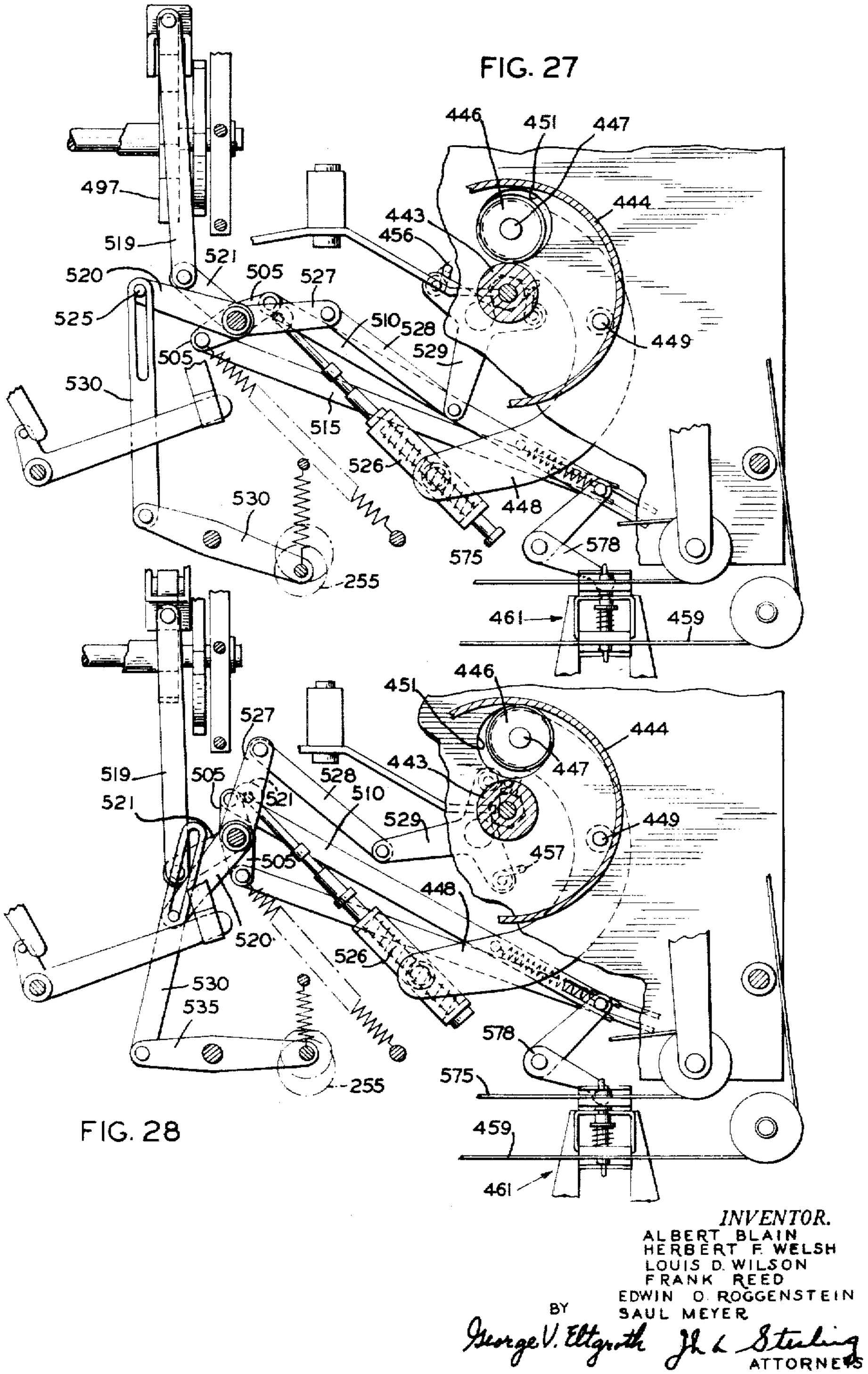
Figs. 27 and 28 are fragmentary views of the mechanism of Fig. 26 shown in the positions assumed for the rewinding and loading operations, respectively.

The tape unit (Figs. 1A and 24 to 29) indicated generally by numeral 200 consists of a top plate 421 from which depends a left side plate 422, a center wall 423, a subpanel 424, and side brackets 425, the latter supporting the unit from the fixed carriage runway 23 of the typewriter. The top plate 421 supports the recording head 205, a capstan 426 and a reel holding mandrel 427. In the operation of the unit, a supply reel 428 of data tape 429, upon which data is to be recorded, is detachably mounted on the mandrel 427 and the free end of the tape is attached, by a spring clip 431 (Fig. 40) to one end of a lead strip 432. The latter has its opposite end secured in any suitable manner to a spring urged storage reel 433 mounted on the under side of the plate 421 in coaxial relation to the mandrel 427. The lead strip 432 is looped about the pulleys 434 and 436 of a tension compensating device 437 and over various guide pulleys 438, across the erasing head 255 and the recording head 205 in succession, and about the major portion of the cork-faced periphery of the capstan 426 and again through the compensating device to pass over spools 439 canted to direct passage of the strip to the storage reel 433 beneath the plate 421. The capstan 426 is fixed to the upper end of a spindle 441 journalled in the top plate and subpanel and carrying between the latter two a lightweight pulley wheel 442 about the periphery of which extends a belt 459, passing over spring tensioned pulleys 445 and driven as later explained. The hub portion of the pulley wheel 442 is fixed to the spindle and is shaped to provide concentric inner and outer walls 443 and 444 respectively. These walls are spaced radially from each other to permit movement therebetween of a friction drive roller 446 secured to the upper end of a flexible shaft 447 carried in the free end of an arcuate arm 448 pivoted at 449 to the underside of the subpanel 424. The shaft 447 is detachably connected as at 450 to the end of the counter drive shaft 36. The subpanel has an opening 451 so that the roller can be swung, by movements of the arm, from a neutral or non-operating position as shown in Fig. 1A to driving engagement with either wall 444 or 443 to provide respectively slow loading (Fig. 28) and fast rewinding operations (Fig. 27) of the capstan 426 through the pulley 442. The lower end of the spindle 441 is threaded as at 452 (Fig. 29) so that a nut 453, having a laterally extending projection 454, can ride up or down on the threaded portion of the spindle as either of two diametrically opposed tappet rods 456, 457 are moved into the path of said projection, for the purpose of controlling the extent of the "loading" operation of the capstan.

In order to initially position the tape 429 for entry of data thereon it is drawn off the supply reel 428 by the lead strip 432 until it is in engagement with the recording head 205. This is done by operation of the capstan when the roller 446 engages the wall 444 of the pulley 442. The extent of movement of the nut 453; which can be adjusted by the position of a lock nut 458 on the spindle, after the projection 454 is engaged by the rod 456; is in proportion to the amount of movement of the lead strip to bring the leading end of the data tape 429 across the recording head 205. This operation is referred to as "loading" which is done, as is "rewinding," by operation of the capstan 426 through the roller 446 in contradistinction to "feeding" which is accomplished by operation of the capstan by the pulley 442 driven by the belt 459 which participates in certain movements of the typewriter carriage 24 through an adjustable clamp 461, mentioned hereafter.

Figures 29, 32, 33:
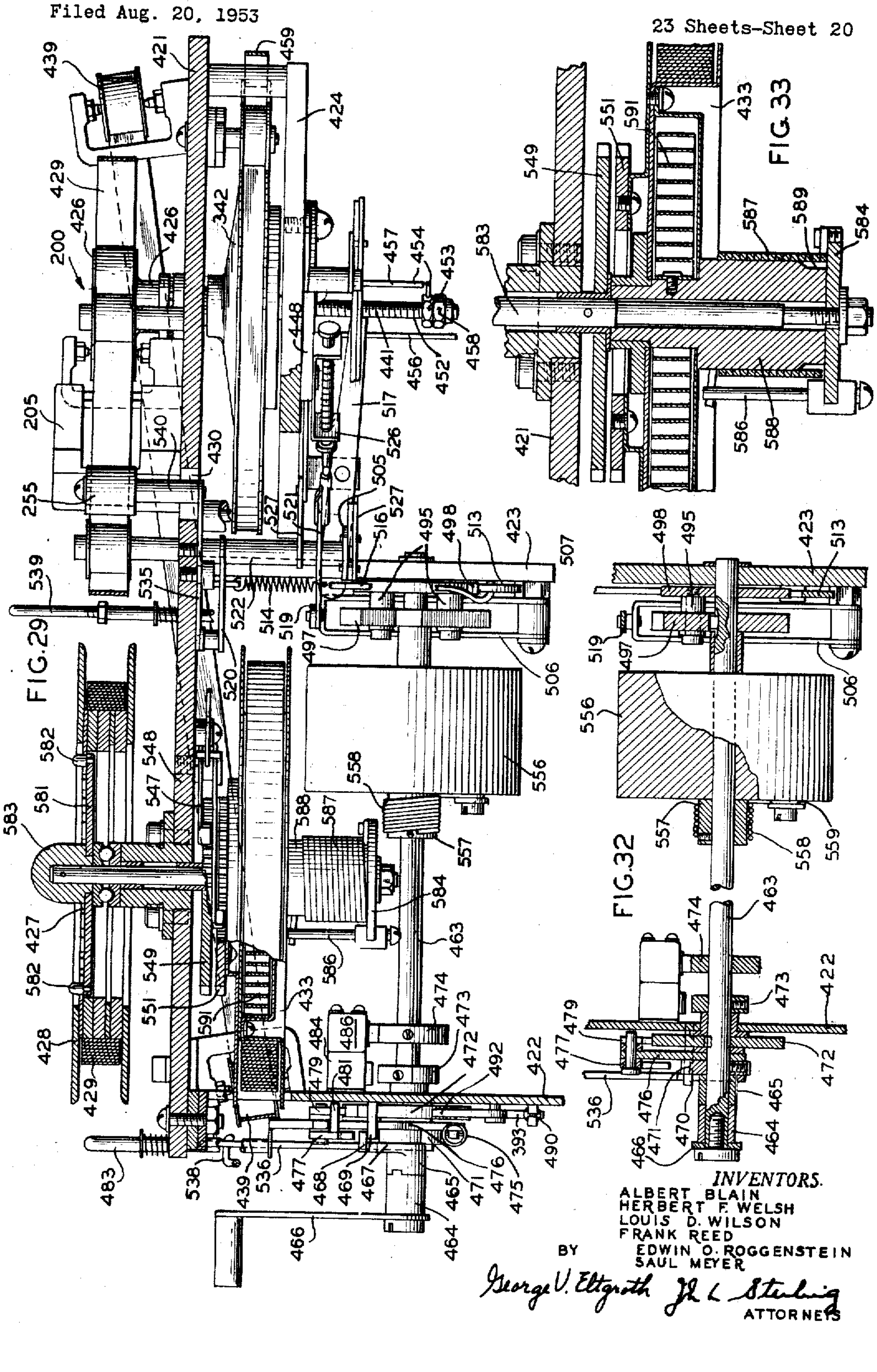
Fig. 29 is a section taken on the line 29—29 of Fig. 25.
Fig. 32 is a section on the line 32—32 of Fig. 26 showing the control mechanism of Figs. 30 and 31 in section.
Fig. 33 is an enlarged section of parts of the supply and storage reels and controls therefor.
Figures 30, 31, 34:
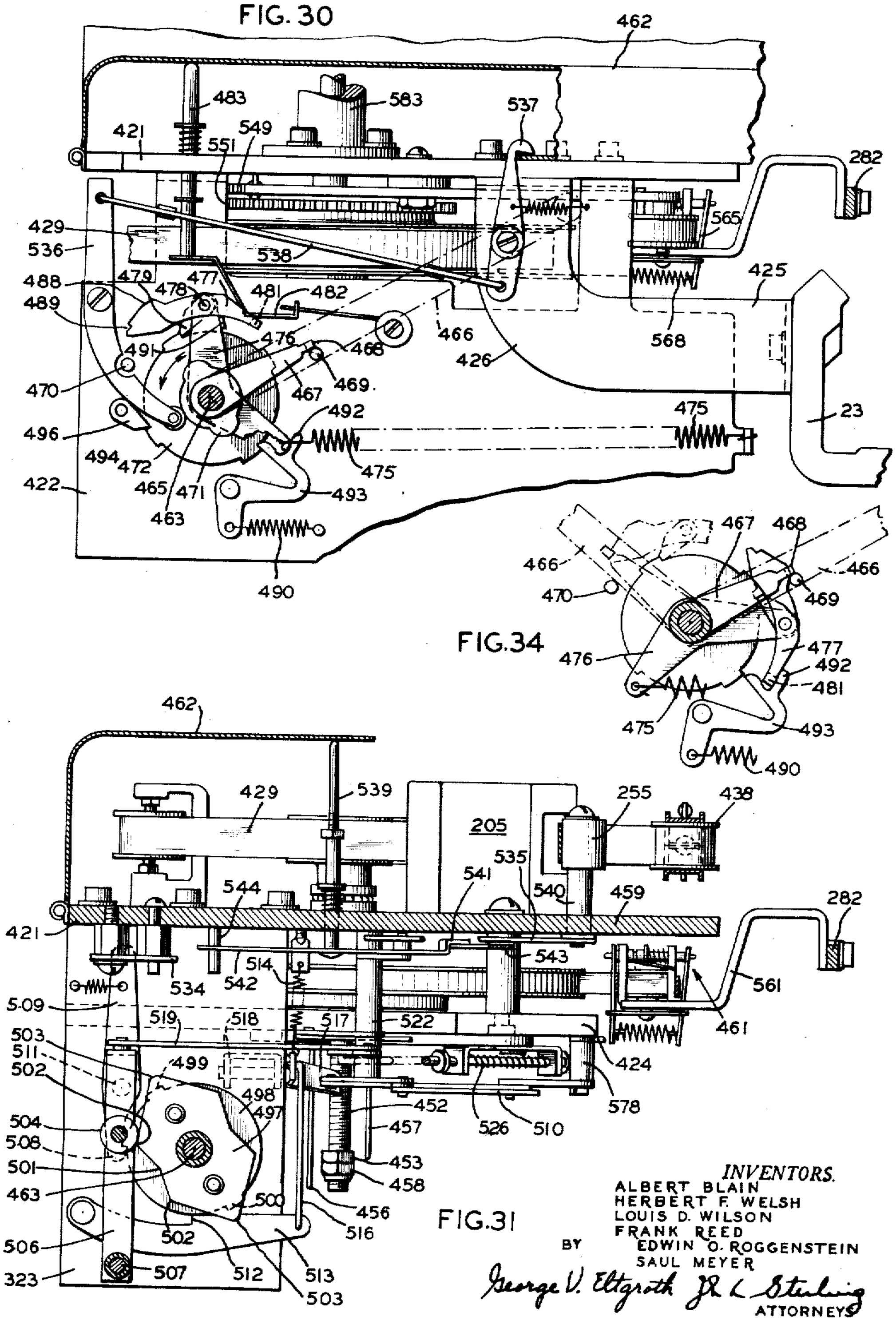
Fig. 30 is a view in elevation of control mechanism seen at the left end of Fig. 26.
Fig. 31 is a section taken on the line 31—31 of Fig. 25 showing control mechanism associated with the mechanism of Fig. 30.
Fig. 34 is a schematic view of the handle actuated trip means in tripping operation.
Figures 35, 36, 37, 38:
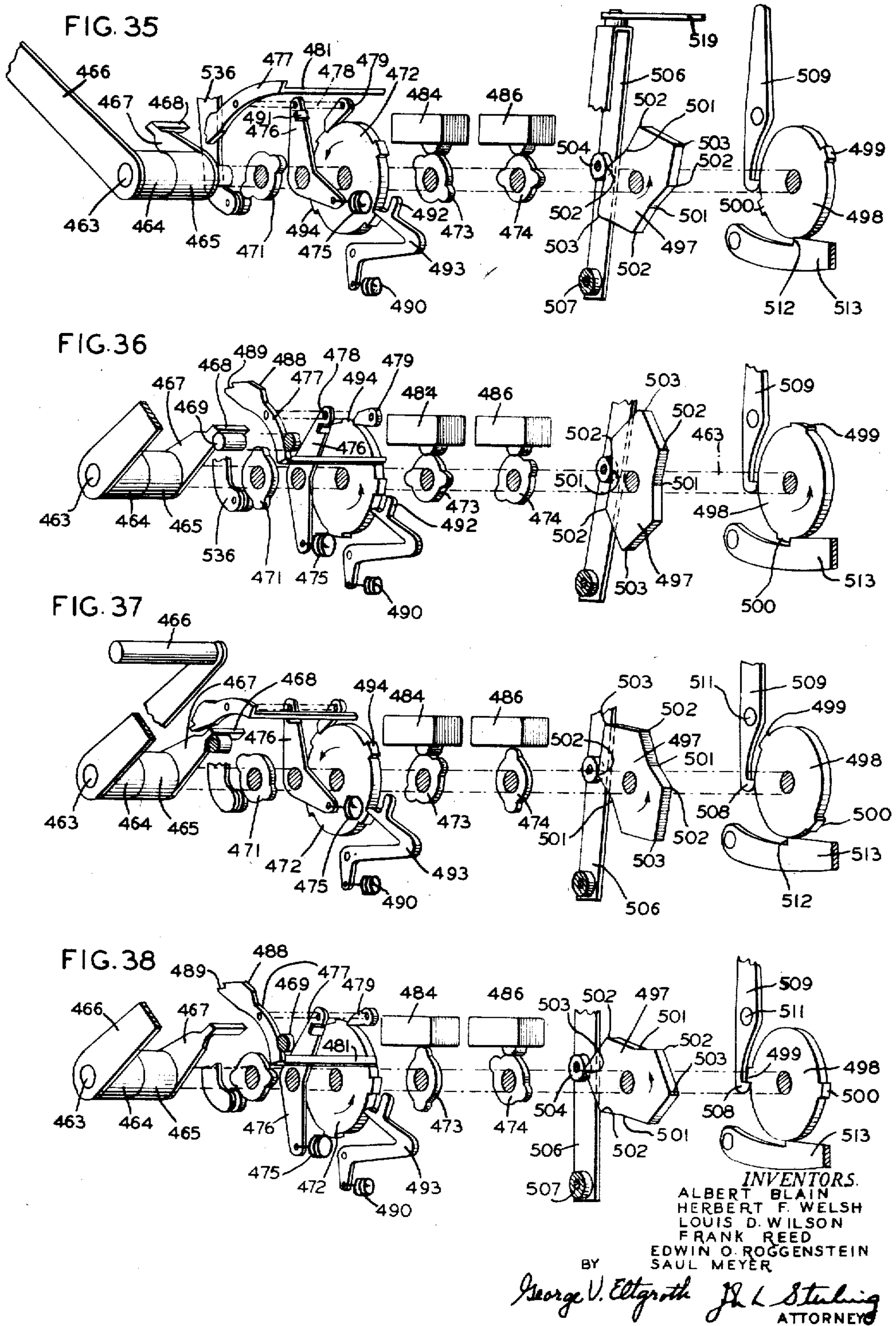
Figs. 35, 36, 37 and 38 are schematic views of the trip operated shaft showing the positions of the parts in the successive operations of cover open, load, typing and rewind, respectively.

When the new reel of tape is placed on the mandrel, and the data tape has been attached to the lead strip by the clip 431 a cover 462 suitably hinged to the rear edge of the plate 421 must be closed before the "loading" operation takes place in order that certain parts may be conditioned for operation. The left side plate 422 and the center wall 423 support a shaft 463 (Figs. 29–38) on which interconnected sleeves 464 and 465 are mounted for free turning movement, the sleeve 464 having an integral handle 466 and the sleeve 465 having an actuator arm 467 bearing a projection or stud 468. The arm 467, aligned with the handle, is limited in its forward and rearward throws against pins 469 and 470 respectively (Fig. 30) carried by the side plate. Rightward from the handle in Fig. 29, the shaft has fixed thereto a cover latch cam 471, a shaft operating detent disk 472 and two switch cams 473, 474, the latter for the operation respectively of an erase circuit switch 484 and a line lock circuit switch 486 to be later explained. Between the disk 472 and the latch cam 471 the shaft carries loosely an actuator lever 476 on the upper end of which is mounted a detent trip arm 477 pivoted for teeter action on a pin 478 and on which arm a dog 479 is loosely carried. At its lower end the lever 476 is connected by a spring 475 with the plate 422. The trip arm 477, at its forward end, carries a laterally extending pin or projection 481 which is engaged by the leaf spring strip 482 of a cover plunger 483, yieldably mounted in the top plate. The trip 477 is shaped at its rear end to provide ledge and shoulder portions 488 and 489 respectively. To allow operation of the parts when the cover is closed the strip 482 yieldably holds the trip in the balanced position shown in Fig. 30 against a projection 491 on lever 476 so that, when the handle is swung to the rear, the stud 468 on lever 467 will ride over the ledge portion 488 against the light yielding resistance of the spring strip 482 and be latched in the shoulder notch 489. The position of the parts shown in Figs. 30, 31 and 37 is during typing and recording and when this is completed rewind of the tape from the lower or storage reel 433 to the upper or supply reel 428 is in order. The handle is then pulled forward or in the direction of the arrow (Fig. 37) and the stud 468 which has engaged the shoulder 489 causes the actuator 476 to move clockwise, through push of the trip arm 477 and against the resistance of the spring 475 to position the pin 481 of the trip 477 inside a lobe 492 on a trigger detent 493. The latter, pivoted to the plate 422, is by spring 490 urged into contact with the edge of the detent disk 472 to engage any one of four teeth 494 peripherally spaced on said disk. As the pin 481 positions adjacent the lobe 492 the dog 479 rides over and engages the next clockwise tooth of the detent disk 472. When the ledge 488 cams the trip 477 in counterclockwise movement by contact with pin 469 to cause the pin 481 to kick the detent 493 out of holding engagement with a tooth on the disk, the dog 479, under influence of the spring urged actuator lever 476 will turn the detent disk 472 in counterclockwise direction until the self restoring trigger detent 493 is engaged by the next succeeding tooth 494. Movement of the disk 472 in clockwise direction is prevented by a spring urged dog 496 mounted on the plate 422.

The shaft 463, adjacent the center wall 423, has secured thereto as at 495 a control cam 497 connected to a control detent disk 498 having diametrically opposite teeth 499 and 500. The cam has diametrically opposite, similar, operating dwells 501, 502 and 503, of different radial distances from the center of the shaft, to provide respectively for "loading," "neutral" and "rewinding" control of the unit through a cam roller 504 carried in a vertical rocker yoke 506 pivoted to the center wall as at 507. In the position of the parts shown in Figs. 30, 31 and 37 the cam roller is on a "neutral" dwell 502 of the cam 497. The latter is moved counterclockwise with each corresponding movement of the detent disk 472 through shaft 463. The periphery of the control detent disk 498 is engaged by the hook end 508 of a spring urged rewind detent lever 509 pivoted at 511 to the center wall, and by the notch 512 of a loading detent lever 513. The latter is held against the periphery of the cam by a spring 514 and is connected by a rod 516 to a lever arm 517 which in turn is pivoted in a bracket 518 and has its free end positioned for operation by the nut 453 at the upper limit of the latter's travel.

When the operating detent disk 472 (Fig. 38) moves counterclockwise as above explained, the tooth 499 of the control detent disk 498 is caught by the hook 508 of detent lever 509 and stops a "rewind" dwell 503 of the cam 497 under the roller 504 after the latter has rocked the yoke 506.

The yoke is connected through a strap 519 with one of the extensions 521 (Fig. 26) of a digitate sleeve 522 rotatably mounted on a post 523 depending from the underside of the top plate. When the cam 497 moves initially, as above described, the sleeve 522 will turn clockwise and through aligned extensions 505 (Fig. 26) will push clamp bar 510 to cause a bell crank 578 to release the clamp 461 and also through said extension 521 will push on the spring link 526 to swing the arcuate arm 448 so that the drive roller 446 will engage the inner wall 443 of the capstan operating pulley and the tape will be rewound from the storage reel 433 to the supply reel 428. Through an extension 520, having pin-in-a-slot connection 525 with a link 530, an erase head lever 535 is moved to swing the erase head 255 out of contact with the tape prior to rewind action. The erase head (Fig. 29) is mounted on a post 540, fixed on the free end of the lever 535 and extending through a limit hole 430 in the top plate 421. Through another extension 527 of the sleeve a link 528 will also swing a pivoted T-lever 529 whose aligned arms carry the tappet rods 456 and 457 to bring the short rod 457 into the path of the projection 454 on the nut 453 so that the latter will be returned to its lowermost position on the spindle from the high position it occupied as a result of the preceding "load" operation.

The storage reel 433 is provided with an arcuately disposed spring strip 531 secured to the inner wall thereof so that a pin 532 on the free end of said strip will swing outwardly in a slot 533 in the side of the reel, when the lead strip 432 is nearly unwound, to engage and move a bell crank lever 534. The latter will rock the rewind detent lever 509 to free the detent disk 498 which will turn until the next tooth of disk 472 is arrested by the trigger detent 493 (Fig. 35). This movement will bring the "neutral" high 502 of the control cam, that is between the "rewind" and "loading" highs, beneath the roller 504 and the drive roller 446 will be returned to its non-driving or neutral position through operation of the parts connecting it to the yoke 506. At this time the cover latch cam 471 will swing a cover latch arm 536 to release the cover by withdrawal of a spring closed latch 537 through the tie rod 538. The upward pressure of the plunger 483 and a spring raised pin 539, (Figs. 30 and 31) will partly raise the cover automatically when the latch 537 is operated by its cam. This occurs only when a "neutral" dwell of the cam 497 following a "rewind," in clockwise order (Fig. 35), is positioned beneath the cam roller 504 due to the relatively located high points on cam 471. When the cover is fully opened, the tape can be detached from the leader by manipulation of the clip 431 and a new supply reel can be placed on the mandrel after the rewound one has been lifted off.

Two complete operations for loading and rewinding with alternate neutral periods are accomplished in one complete rotation of the shaft 463 and its control cam 497 and the cover latch cam 471 is provided with two high dwells corresponding to each neutral position after rewind. The neutral position, between loading and rewind, defines the period during which the tape is operated through the clamp 461 by the movements of the typewriter carriage. The cams 473 and 474 which operate respectively a recording head erase circuit switch 484 and a line lock circuit switch 486 have, like the cover cam 471, two high dwells each.

As the cover opens, the pin 539 will lift the offset end 541 of a reed detent 542 (Figs. 26 and 31), fixed to the lower end of said pin and guided by a stud 544, to free the long arm of a pawl bell crank 543 and let spring urged upper and lower pawls 547 and 548 respectively engage the teeth of upper and lower reel locking disks 549 and 551 respectively. The bell crank 543 was previously pushed over the flexible end of the reed detent 542 to snap into the offset flexible end thereof so that a pin 546 carried in the short arm of the bell crank could maintain said upper and lower pawls out of engagement with the upper and lower reel locking disks. As will be later explained, the disks are free of the pawls at all times that the cover is closed. The pawls are moved into engagement with the disks by springs 552 when the long arm of the bell crank 543 is against the pin 525 of an extension 520 on the sleeve 522, as shown in outline in Fig. 26. When the new supply reel has been placed on the mandrel; the tape connected to the lead strip 432 and the cover closed; the handle on a forward pull moves the actuator lever 476 and causes the cam roller to move into a depression 501 of the cam defining a "loading" dwell (Fig. 36). This movement, through the strap 519, rotates the sleeve 522 counterclockwise (Fig. 26) to cause an extension 505 to push on clamp bar 515 to cause the bell crank 578 to release the clamp 461 and through the spring link 526 engage the drive roller 446 with the wall 444 of the pulley 442 so that the lead strip 432 will pull the tape 429 to its starting position in contact with the recording head 205. This action of the sleeve through extension 520 causes the pin 525 to move the bell crank 543 clockwise until it latches over the end of the reed detent 542 which has been forced down by the pin 539 as the cover closes. The upper and lower pawls are thus moved out of engagement with their respective locking disks by the pin 546. Rotation of the sleeve 522 also causes the T lever 529 to move clockwise so that the long rod 456 is placed in the path of the projection 454 on the riding nut 453 to cause the latter to travel up the spindle 452. When the nut reaches the limit of its upward travel it rocks the lever arm 517 to cause the loading detent lever 513 to free the detent disk 498 (Fig. 36) to bring a "neutral" dwell of cam 497 under the cam roller 504 (Fig. 37) and, through operation of the yoke, restore the drive roller 446 to non-operating position. The amount of upward movement of the nut 453 is proportional to the length of the lead strip and the leading end of the tape will be brought automatically to recording position with respect to the head 205.

From the Fig. 35 position of the parts which is the "neutral" after "rewind" and the cam 471, has unlatched the cover, the handle is pulled forward after the tape 429 of the new reel has been clipped to the lead tape 432 and the cover is latched shut. This is the load stroke of the handle and when the trigger 493 has been kicked, the spring 475 will rotate the load control detent disk 498 until it is arrested by the loading detent lever 513. As will be seen in Fig. 36, the dog 479 is applying turning pressure to the detent disk 472 through spring 475. When the loading operation has been completed, the operation of lever 513 from the riding nut 453 will release the disk 498 and the dog 479 will rotate detent disk 472 until it is arrested by the trigger 493 as in the Fig. 37 position of the parts. This is a neutral position during which typing and recording take place. When the latter has been completed a pull on the handle will cause the dog 479 to rotate the detent disk 498 until it is arrested by the rewind detent lever 509 (Fig. 38). When rewind is complete, the pin 532 in the storage reel will move radially to release the lever 509 by operation of the bell crank lever 534 and the dog will turn the detent disk 472 until the latter is arrested by the trigger and the parts appear as shown in Fig. 35.

The shaft 463 is given a very quick counterclockwise turn as a result of the impetus given the actuator lever 476 by the spring 475 upon release of the trigger 493. In order that overthrow of the parts will be prevented, a torque cushioning weight 556, Fig. 29, is mounted for free rotation on the shaft 463 abutting a sleeve 557 fixed to the shaft and about which sleeve a coil spring 558 is wound. The latter has one end connected to the weight as at 559 and frictionally engages sleeve 557 so that the quickly applied force of the rotary thrust of the shaft will be partly absorbed by the inertia of the weight and an even turning force will be applied to the cams and other operated parts.

Figures 24, 39, 40, 42:
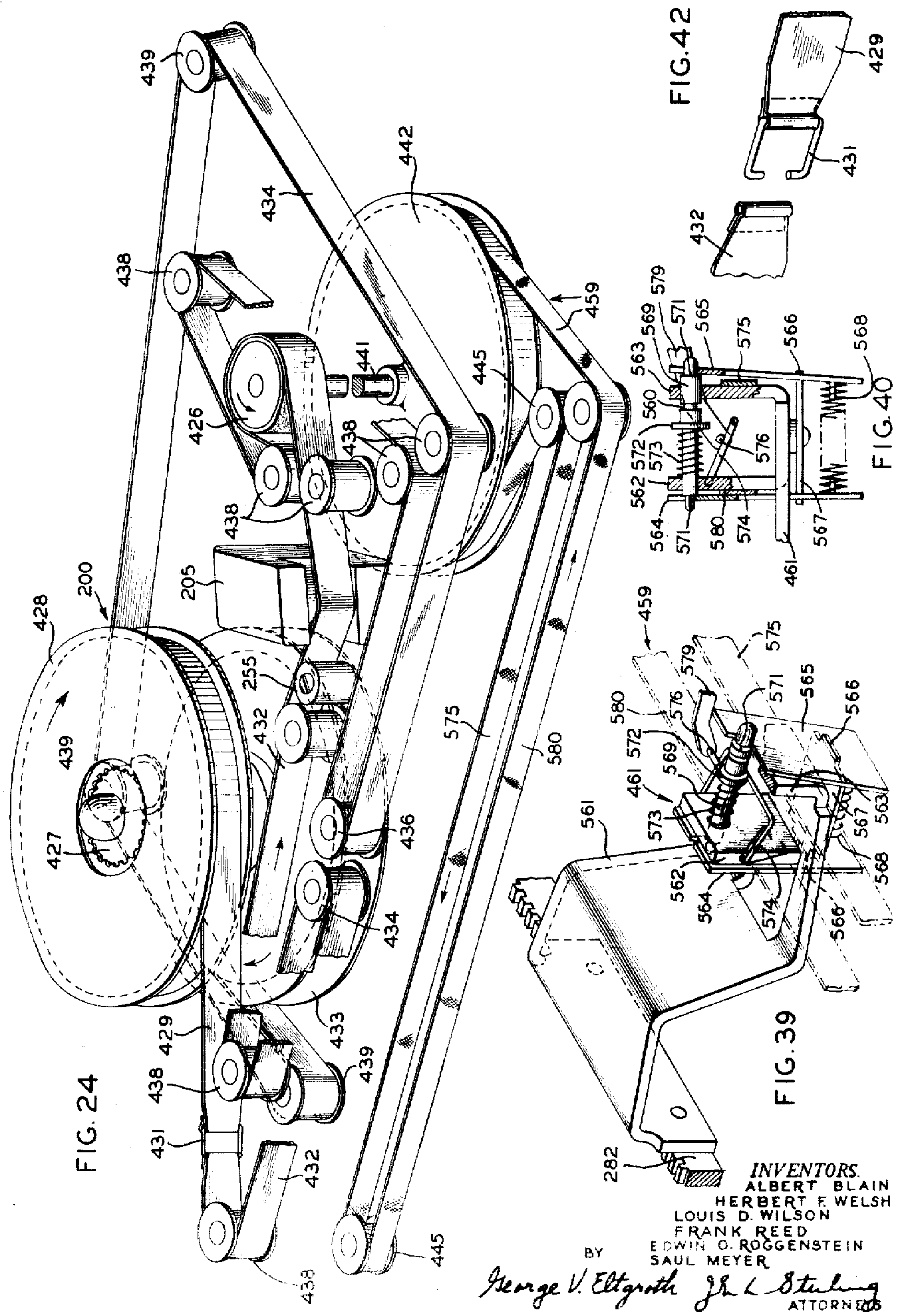
Fig. 24 is a diagrammatic view in perspective showing the belt, the lead strip and the tape preparatory to feed of the latter to position to be recorded upon.
Fig. 39 is an enlarged view in perspective of the clamp used to connect the typewriter carriage to the operating belt of the tape unit.
Fig. 40 is a vertical section taken through the clamp shown in Fig. 39.
Fig. 42 is a view in perspective of the clip for connecting the ends of the lead strip and the data tape.
Figure 25:
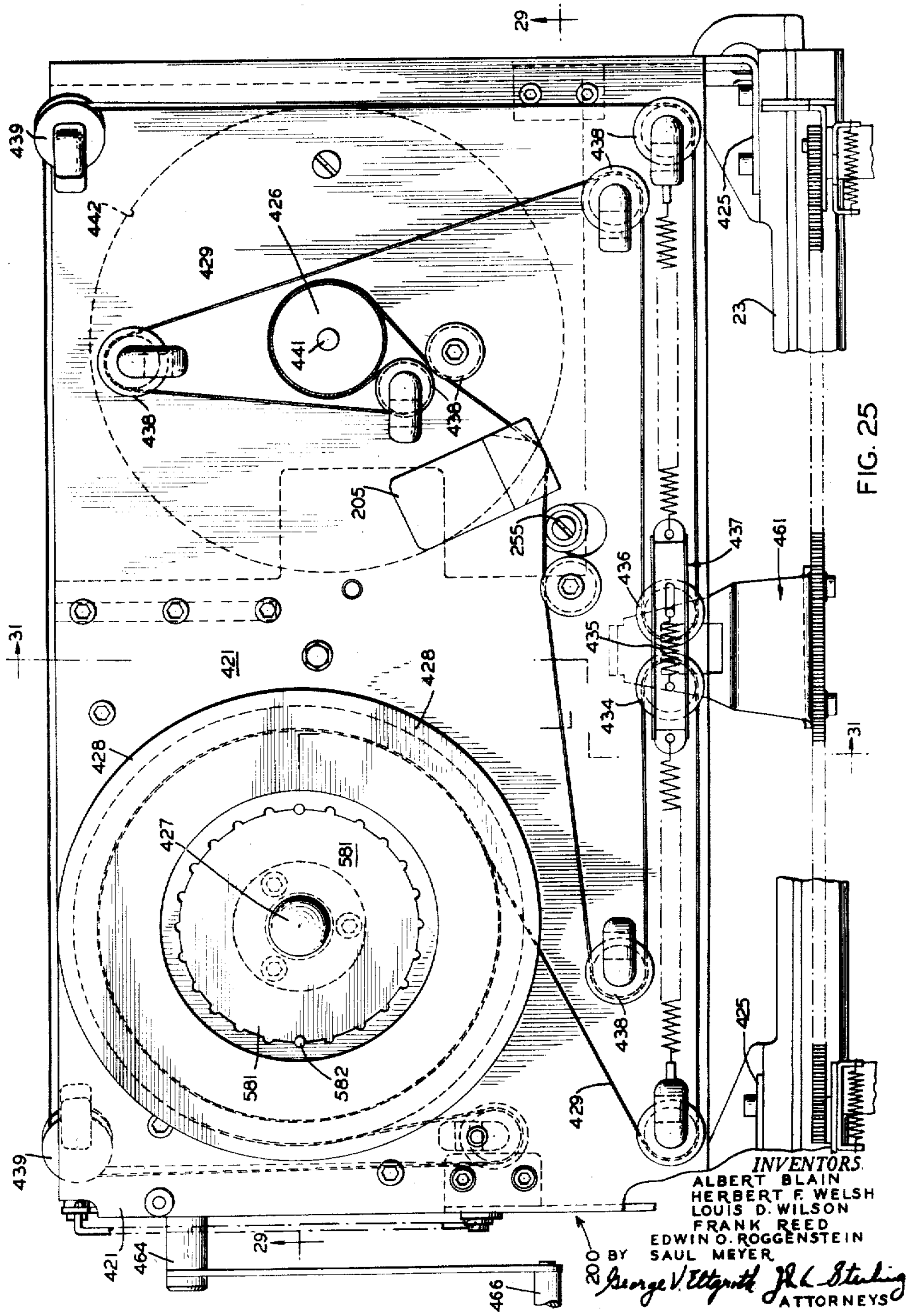
Fig. 25 is a top plan view of the magnetic tape unit used with the typewriter for entering data on a tape.
Figure 26:
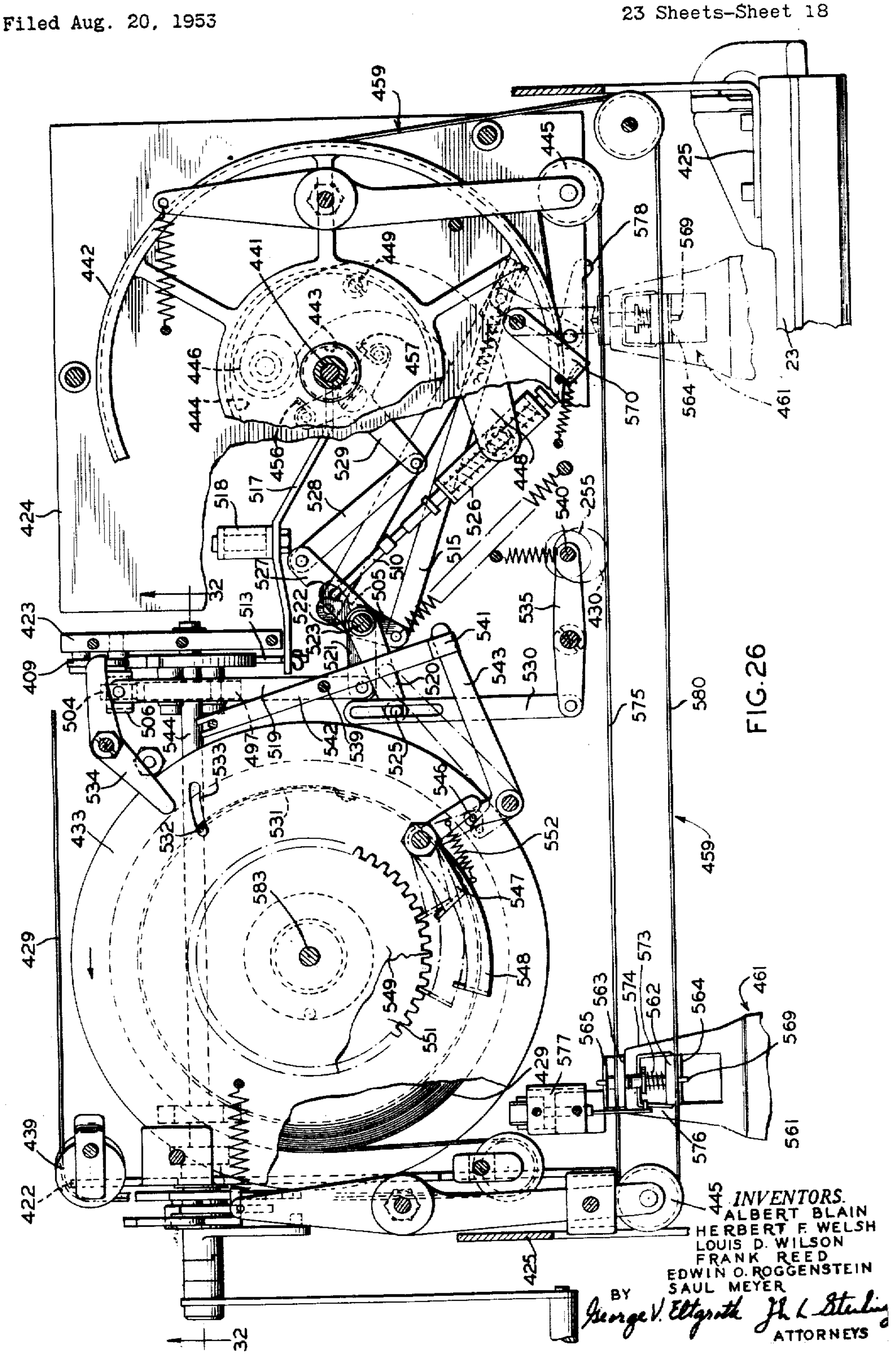
Fig. 26 is a plan view of the tape unit taken below the top plate thereof.

In addition to the power operation of the tape unit, from the drive shaft 36 of the typewriter, movement of the carriage 22 may also control the movement of the data tape 429 through the drive belt engaging clamp 461. The latter (Figs. 1A, 26, 39 and 40) is made up of a bracket 561 suitably secured to the back of the margin stop rack 282 and shaped to override the switch blade 309 (Fig. 2) and provide vertical fixed jaw portions 562 and 563 with which coact, respectively, clamp plates 564 and 565 which are pivotally secured at their lower ends to tabs 566 formed at the opposite ends of a pivot plate 567 secured to the underside of the bracket. A compression spring 568 between the lower extremities of the clamp plates urges them toward the jaw portions to grip the drive belt 459, in accordance with the action of a control plunger 569. The latter has reduced guide ends, which pass through slots in the upper ends of the plates and provide shoulders 571 for abutting relation with said plates, and an annular collar 572 between which and the jaw portion 562 a coil spring 573 is positioned. A spring raised bail 574 is pivoted in the jaw 562 so that when the plunger is pushed, against the resistance of the spring 573, the bail engages a peripheral groove 560 to latch the plunger 569 in restrained or cocked position. Referring to Fig. 40, the bail has been shown after it has been released from plunger restraining position by the action of a release pin 576 carried on the armature extension 579 of a tape drive reversing electromagnet 577 which is in a circuit controlled by the trip key 253 actuated for carriage return. The release of the plunger causes a shoulder 571 thereof to push the clamp plate 565 open or away from the jaw 563 to free the grip of the clamp on the inner reach 575 of the belt 459 or the one nearest the operator, and to cause the clamp plate 564 to grip the outer reach 580 of the belt. Prior to this action the clamp has moved said inner reach of the belt 459 leftward during typing and the tape 429 has moved rightward a distance of one blockette or a space proportional to one hundred and twenty characters of type matter. When the clamp moves rightward in carriage return operation, the belt causes the tape to be moved rightward, without recording action thereon, a distance less than the space of one blockette. During this rightward movement of the clamp the protruding end of the plunger 569 engages the cupped end of a camming lever 570, pivoted to the underside of the top plate 421, to swing the lever against the resistance of its spring until the plunger is pushed back or retracted far enough to let the bail 574 engage the peripheral groove 560 after which the end of the plunger slides off the end of the self restoring lever 570. This action of the plunger opens the clamp plate 564 and allows the compression spring 568 to close the plate 565 to grip the outer reach 580 of the belt with the result that the balance of the carriage returning movement will cause the tape 429 to move in the leftward direction or opposite to its normal or recording feed direction and hence provide a space between blockettes of recorded information that is slightly less than the length of the blockette. The end of the carriage return movement of the clamp, rightward in Fig. 26 will bring the median line of the clamp into register with a clamp release sleeved bell crank 578 which is actuated, as above explained, under control of the cam 497 to push on the inner clamp plate 565 near its lower end (Fig. 1A) to free the inner reach of the belt, thus keeping the clamp entirely clear of the belt so that the latter can operate freely as the pulley is driven by the drive roller 446 during the rewind and load operations.

The size of the tape unit is materially reduced by mounting the supply and storage reels above and below the plate 421 in coaxial relation. As seen in Figs. 24, 26, 29 and 30 the mandrel 427 includes a disk 581 having peripheral pins 582 for detachable engagement by the serrated ring portion of the supply reel 428. The disk is connected to an axle 583, to the lower end of the latter of which is secured a clutch disk 584 having fixed thereto an upstanding pin 586 and the lower end of a helical clutch spring 587 of square cross section. The spring frictionally grips the cylindrical surface of an Oilite sleeve 588 supported on said disk and having a shouldered lower end presenting an annular trough 589. The sleeve is free of the axle 583 but when the latter is turned clockwise manually a clock type spring 591, one end of which is secured to a reduced portion of said sleeve, is wound to provide rotary motion for the lower storage or take-up reel 433 to which the other end of the spring is attached. As previously mentioned, the supply and storage reels 428 and 433 have secured thereto respectively the upper and lower locking disks 549 and 551 engaged respectively by upper and lower pawls 547 and 548 when the cover of the unit is open. When the cover is closed, however, the pawls free the disks and the reels operate independently of each other but under the tape feeding influence of the capstan 426. Both reels rotate in clockwise direction during recording and in counterclockwise direction to rewind. The differences in the relative speeds of the reels due to the increasing and decreasing diameters of the tape wound thereon are automatically compensated for by the clock spring which drives the reel with the smaller diameter of tape thereon faster than the reel with the larger diameter of tape thereon.

During the loading and recording operations, the spring 591 applies clockwise force to the take-up or storage reel 433 and through the clutch and axle 583 applies counterclockwise force to the supply reel. This yieldable resistance to the feed of the tape off the supply reel, by the capstan, is counteracted by a yield of the compensating device 437, the pulley 434 of which tensions the spring 435. While the supply reel 428 is more than half full of tape its rotation is slower than that of the storage or take-up reel 433 whose spring urged operation keeps the tape between the reel 433 and the compensating device taut. As the supply reel becomes more than half empty it revolves faster than the take-up reel and winds up the spring 591 faster than it unwinds itself to rotate the reel 433. In order that the spring will not become overwound, the slip clutch operates. When the resistance of the spring 591 reaches a predetermined amount the resistance of the sleeve 588 to turning will cause the disk 584 to rotate the spring 587 and because the upper coils thereof grip the sleeve, the lower coils will be pulled into the trough 589 and will permit the disk to revolve enough to bring the pin 586 on said disk into engagement with the free extending end 590 of the spring 587 and force the upper coils thereof open enough to free the sleeve 588 so that the axle and disk can continue to rotate without further winding the spring 591. This action will let the spring 591 rotate the sleeve in counterclockwise direction until the over-wound tension is relieved and at the same time the lower end of the spring 587 will unwind out of the trough to rotate the disk 584 counterclockwise to space the end of the spring from the pin and let the spring assume its gripping relation with the sleeve. The reverse rotation of the axle which is small is taken up by the compensating device 437.

On rewind, that is when the tape is fed from the take-up reel back onto the supply reel by the capstan, after recording has been completed, the pull on the tape will wind the spring 591 and the latter in its unwinding effort will, through the sleeve 588 and axle 583, rotate the reel 428 counterclockwise to wind the tape thereon. The operation of reel 428 will be faster than operation of reel 433 and the spring provides sufficient tension to keep the tape taut between the capstan and the reel 428 upon which the tape is being rewound. As the reel 433 gets more than half empty, the spring 591 will be wound up more rapidly than its unwinding force is operating the reel 428 with the result that the slip clutch will operate to prevent overwind of the spring as above explained. Inasmuch as the supply reel 428 may be turned by hand and since any operation which gives the supply reel greater angular velocity than the take-up reel has, the clutch acts as a safety device for preventing overwind of the spring, and the tensions occasioned by the variations in the changes of angular velocities imparted to the reels is balanced by the automatic operation of the tension compensating device 437.

Figure 43:
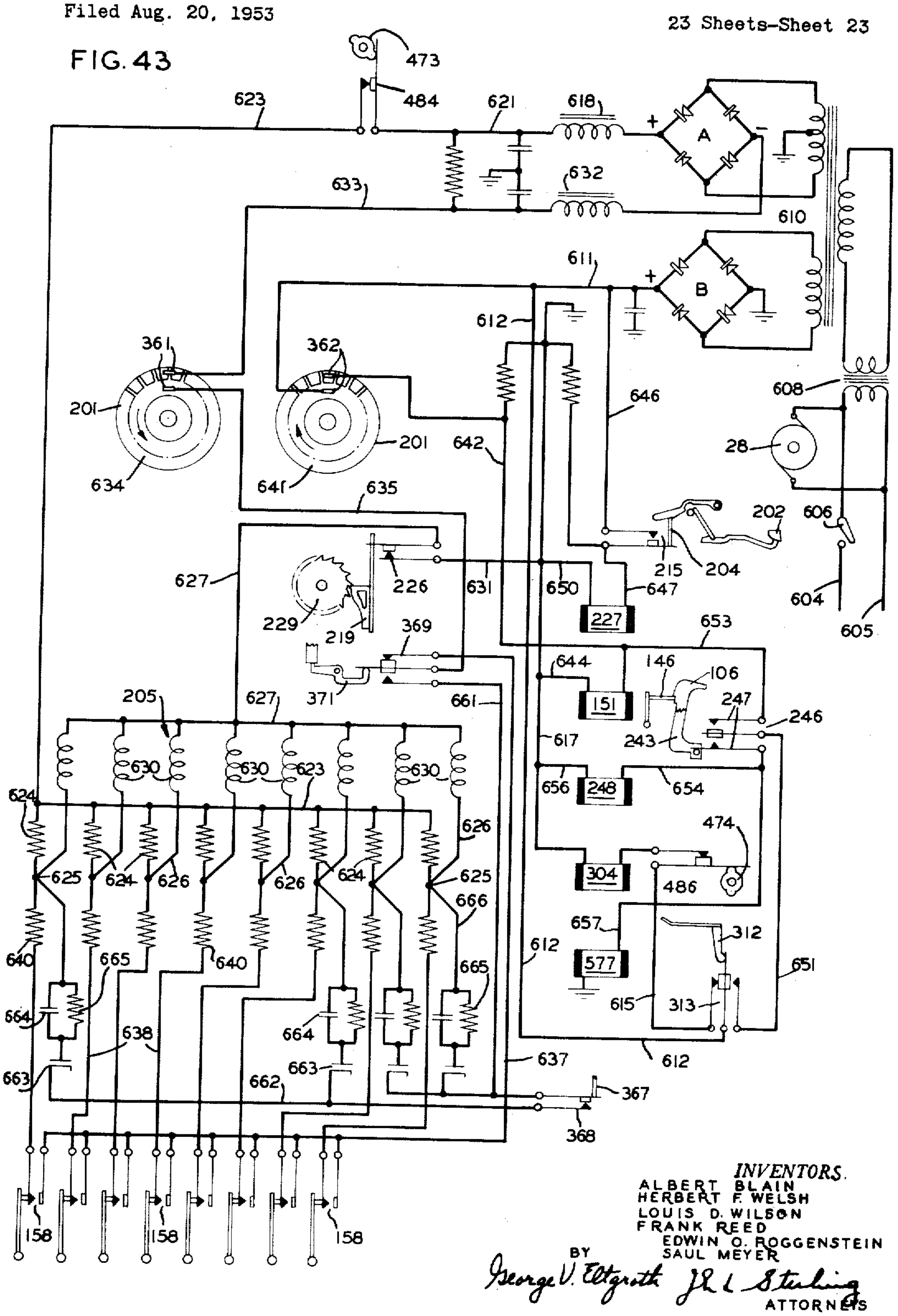
Fig. 43 is a wiring diagram of the machine.

Fig. 43 shows the electrical circuit for entering discrete magnetic spots on the tape at the same time that characters are printed or typed. The magnetic recording is done by the writing or recording head 205 composed of eight individual coils wound as shown and described in the Patent No. 2,618,709 referred to above. The coils are controlled by switches 158 which are in turn closed by the encoding strips 111—118 under control of the typewriter keys. Current of one polarity is initially applied to the head and recording of signals or data magnetically on the tape is done by applying current of a reverse polarity to the head.

Current is supplied for the machine over A. C. leads 604 and 605 and is controlled by a main switch 606. A motor 28 for driving the typewriter is connected to leads 604 and 605 which in turn are connected to the primary of a transformer 608, the secondary of which is in turn connected to the primary of a second transformer 610. This latter transformer has two secondary windings across each of which is connected a rectifier A or B. Closure of the main switch 606 will start the typewriter motor 28 and close a circuit from the positive side of rectifier B over leads 611 and 612 through the left hand break contacts of the Right Margin switch 313 (Fig. 2) controlled by the arm 312 actuated by the carriage 22 when it reaches its right margin position. The circuit then continues over lead 615 to a Line Lock switch 486 and thence through the winding of the Line Lock actuator 304 and thence over common ground lead 617 to ground.

The switch 486 is operated by the cam 474 on shaft 463 actuated by the handle 466 used in control, load and rewind of the tape. The Line Lock actuator 304 controls a common bail or line lock bar 263 (Fig. 1) which, when the actuator is operated, is maintained in an ineffective position and permits free use of all of the typewriter keys. During normal operation of the machine the Line Lock actuator 304 is maintained operated but should the current fail, the actuator will be released thereby locking up all of the keys in the typewriter keyboard. Thus the Line Lock actuator is operated at all times permitting use of the keyboard except when the carriage reaches the right hand margin switch of the 121st position where this circuit is opened and the Line Lock actuator 304 is released thus locking up the keyboard to prevent operation of all keys except the Trip key 238, the Backspace key 202 and the Erase key 237. The Line Lock actuator 304 is also maintained in operative position by the cam operated Line Lock switch 486 which, when open, releases the actuator to prevent operation of the keyboard during the rewinding or loading of the tape. A power failure or the opening of the main switch will also cause the Line Lock actuator 304 to release, thus preventing the possible setting up of encoding bars to enter a false signal.

The writing circuit is actually composed of two individual circuits, one of which may be traced from ground through the upper secondary of the transformer 610 through the rectifier A out of the positive side thereof, through choke coil 618 over lead 621 and thence through the recording head circuit switch 484, under control of cam 473, and over common lead 623 through resistances 624 to connection points 625 and thence over leads 626 to each individual coil 630 of the writing or recording head 205, thence over common lead 627 through Backspace pawl switch 226 controlled by the Backspace pawl 219 (Fig. 14), over leads 631 and 617 to ground. This circuit places the normal or positive current of one polarity on all of the writing coils effecting an erasing action. Upon depression of a typewriter key, one or more of the switch contacts 158 is closed and held closed by the combined action of the code key actuated code strips and their detent latch bail 146 and thus complete the writing circuit from the negative side of transformer A, through choke coil 632, lead 633 to the inside face 634 of the make and break disc 201 and its brushes 361, over lead 635 to the upper break contacts of the Tabulator switch 369 controlled by lever 371 from the Tabulator key 332, common lead 637, through the closed contacts 158, over leads 638, resistances 640, connection points 625, leads 626, through the selected coils 630 and thence by way of common lead 627, Backspace switch 226, leads 631 and 617 to ground. Due to the fact that the resistance 640 is a great deal less than resistance 624 negative current will flow from connection points 625 through the coils 630 selected by the switches 158 thus entering a discrete magnetic signal on the tape by reversing the polarity of the current.

As each character is typed and entered on the tape the typewriter carriage 22 steps one step and the make and break disk 201 turns so that the inside face 634 and the outside face 641 thereof are rotated one segment. As described above, the inner face 634 controls the printing circuit. The outer face 641 controls a further protective feature in that it releases the last pattern of encoding bars set up by the keyboard. This is accomplished over a circuit from the positive point of rectifier B, lead 611, brushes 362, lead 642 through the winding of the electromagnet 151 of the code key latching bail 146, leads 644 and 617 to ground. The electromagnet 151 withdraws the bail from the code keys 106 that have set the code strips 111—118 thus permitting the latter to open any of the switches 158 which have been closed. The faces 641 and 634 of the make and break disk 201 are positioned in such relation to each other that the writing circuit is completed before the circuit to the electromagnet 151 is closed to release the code keys and strips. This will insure completion of the signal but will prevent the holdover of any signal from one space to another and insures that negative current has been removed from the writing circuit and only positive current is flowing.

Should the operator in typing make an error, she may operate the Backspace key 202 on the keyboard which in turn closes the Backspace solenoid switch 215. The latter closes a circuit from ground through rectifier B to the positive point thereof, leads 611 and 646, through the solenoid switch 215, lead 647, through the Backspace solenoid 227 and thence over leads 650 and 617 to ground. The Backspace solenoid 227 is a booster for assisting in the action of the Backspace mechanism, Figs. 13 and 14, to effect the raising of a pawl 219 which controls the spacing of the carriage to the right one space. This pawl in rising momentarily opens the Backspace pawl switch 226 thereby opening the common ground circuit 617, 631, 627 for the writing head 205 and thus preventing either the normal erasing current of one polarity or writing current of a reverse polarity from entering the writing head during the Backspace operation until the carriage settles, at which time the pawl 219 drops down and the switch 226 closes to complete a circuit supplying the normal or erase current which erases the incorrect entry on the tape. The correct entry is then made through the printing circuit as above described. This is done to eliminate errors should the carriage in backspacing overthrow into the adjacent space beyond the one to which it is to be spaced and in this manner erasing the next adjacent character or entering a false character in this position on the tape 429.

When the operator wishes to erase the data on the tape corresponding to part or all of a line of typing, the "Erase" key 253 is operated and the carriage returned without operating the tape reversing magnet 577 with the result that the tape is reversed in its direction of travel past the head so that the normal current applied to the tape will erase the data previously entered therein.

The operator continues to type until 120 characters have been entered on the tape or the carriage reaches and opens the left hand break contact and closes the right hand make contact of Right Margin switch 313. With the right hand contact of the Right Margin switch closed a circuit is prepared from the pulse side of the B rectifier over leads 611 and 612 through the right hand contact of the Right Margin switch 313, lead 651, to the contacts 247 controlled by the Trip key 238 (Figs. 2 and 43) which through a related code key 243 actuates the Trip switch 246. The latter when actuated closes two circuits, one traced from the rectifier B over leads 611 and 612 through the right hand contact of the Right Margin switch 313, through the contacts of the Trip switch 246, lead 653, through the latch bail electromagnet 151 (Fig. 15A) and thence over leads 644 and 617 to ground, thus unlatching the operated code keys 106 to release the code strips. The second circuit is traced from positive lead 612 through the right hand contact of the Right Margin switch 313 to the Trip switch 246 over lead 654, through the carriage return electromagnet 248 (Fig. 1) and thence over conductors 656 and 617 to ground. This circuit causes the carriage to be returned to the left margin and when once started goes to completion. A third circuit is closed from positive lead 612 to the right hand contact of the Right Margin switch 313, the Trip switch 246 over conductor 657, through the Tape Drive reversing electromagnet 577 to ground. The Tape Drive Reverse 577 (Fig. 26) causes the clamp plates 564 and 565 of the clamp 461 on the back of the carriage to be reversed in action to clamp the belt 459 in such a manner that the tape 429 will be fed forward or advanced while the carriage is returning to the left margin. This forward spacing of the tape inserts a space between blockettes.

Since all of the 120 positions on the tape included within a blockette must contain some character, an automatic signal introducing means is provided which is used during the tabulating or skipping from one position to another in which no specific data is to be entered. A Fill switch 368 (Fig. 2A) is provided which when open, as is shown, causes "Space" signals to be placed in the tape and which closed causes "Zero" signals to be placed in the tape. This switch 368 is under control of a manual "Fill In" key 363 on the front of the machine (Fig. 20). The introduction of these signals in the tape is under control of the Tabulator switch 369 (Figs. 2 and 17) which is actuated through the lever 371 and the stop 331 from the Tabulator key 332, so that when the carriage is tabulating from one position to another the circuit to the code key and strip controlled switches 158 is opened and a circuit is closed through the lower contact over one of the following paths. With the Fill switch 368 open and a circuit extending from the negative point of the rectifier A through choke coil 632, lead 633, inside face 634 of commutator 201, lower contact of Tabulator switch 369, which is now closed, lead 661, through two circuits each containing a diode 663 and a condenser 664 and resistance 665 in parallel and thence over lead 666 to the connection points 625 and thence over leads 626 and through the writing coils 630 and thence over lead 627 through Backspace switch 226, leads 631 and 617 to ground. This circuit will cause magnetic spots to be entered in the 7th and 8th channel positions of the tape (Fig. 11) which is the code for delta or a "Space" signal. Should the operator desire to enter "Zero" designations the Fill switch 368 will be closed and then four similar circuits will be completed, one over the just recited circuit and the other over lead 661 and through the Fill switch 368 and thence over lead 662 and through a similar network to writing coil channels 1 and 6, thus entering the signal in the 1st, 6th, 7th and 8th channel positions on the tape for a Zero.

When the operator has completed the data she desires to enter in the tape and the Trip key 238 has been operated to return the carriage to the left hand margin, the handle 466 (Figs. 35 to 38) for controlling the feeding and rewinding of tape 429 can be actuated. This will permit the opening of the cover on the tape unit and automatically start rewind. When the rewind starts the cams 473 and 474 will open the switches 484 and 486 respectively. Switch 484 will remove positive or erase current from the circuit to the writing heads thereby preventing the erasure of the data already entered on the tape. Switch 486 will open the circuit to the Line Lock actuator 304 (Fig. 1) which will cause this actuator to be released thus locking up the keyboard of the machine through the line lock bar 263 to prevent the entry of any data while the tape is being rewound. When a new tape is placed on the upper reel and the handle pulled forward to "Load" said tape into the machine, the cam 473 lets the switch 484 close and permits erase current to be placed on the tape but it does not permit cam 474 to close the switch 486. This keeps the keyboard locked up and prevents the entry of any data during the feeding in of the tape.

While this invention has been described and illustrated with reference to a specific embodiment, it is to be understood that the invention is capable of various modifications and applications, without departing essentially from the spirit thereof, which will become apparent to those skilled in the art. For example, a key actuated card punching machine can be used with the tape unit for perforating the data in a card or sheet, in a selected code, from which the tape can be magnetized or punched without the use of decoding mechanism, or the typewriter may include accounting mechanism as in a bookkeeping machine.

What is claimed is:

1. In combination, key means for entering data on a sheet, power means for operating said key means, means controlled by the operation of said key means for magnetically recording said data on a tape, belt means for operating said tape, means controlled by the operation of said key means for moving the sheet past said data entering means, clamp means operable by the movement of said sheet moving means for operating said belt and moving the tape past said data recording means, and means operated by said power means for moving the tape independently of said belt and clamp means.

2. In an apparatus for entering data on a record and magnetically recording code designations thereof on a tape, carriage means for feeding said record, belt means for feeding said tape, key means for effecting entry of data on the record and controlling the operation of said record feeding carriage means, means for recording the encoded data on the tape, a circuit including the encoding and recording means, means for operatively connecting said key means and said encoding means, clamp means for operatively connecting said record feeding means and the tape feeding belt means and means in said circuit for controlling the operation of said connecting means.

3. In an apparatus for entering data on a record and magnetically recording representations thereof on a tape, reciprocatory carriage means for supporting the record, belt means for advancing the tape, key means for effecting entry of data on the record, means controlled by said key means for recording representations of the data on the tape, means connecting said record supporting means and said tape feeding means and means for operating said connecting means for moving the tape in one direction during movement of said record supporting means in either direction.

4. In a machine of the class described, the combination with a typewriter having a carriage movable in letter space and return directions, a mechanism for printing data on a work sheet held in said carriage and means governed by the printing mechanism for controlling the movement of said carriage; of a tape unit, means controlled by the operation of said printing mechanism for magnetically recording said data on a tape, belt means for moving said tape past said recording clamp means, clamp means on said carriage initially adjusted to connect said tape moving belt means and said carriage to move the tape in one direction corresponding to the letter space movement of said carriage, means controlled by said printing mechanism for re-adjusting said clamp connection to move the tape in said one direction when the carriage moves in return direction, and means for restoring said connecting clamp means to its condition of initial adjustment during said carriage return movement to reverse direction of movement of said tape.

5. In a machine of the character described, the combination with a typewriter having a movable work sheet supporting carriage, mechanism for printing on said sheet and escapement means controlled by said mechanism for governing the movement of said carriage; of a tape mounting unit, circuit means including encoding and recording means controlled by said printing mechanism and adapted to supply positive erase and negative recording current to a magnetic tape of said unit, means for backspacing said carriage and one of said circuit means being controlled by operation of said backspacing means for entering erase current on the tape.

6. In a device of the character described, the combination with a machine having a movable work sheet supporting carriage, means for entering data on said sheet and escapement means for controlling the movement of said carriage; of a tape unit, circuit means including recording means controlled by the operation of said data entering means for supplying positive erase and negative recording current to said head for magnetizing said tape, carriage return means including said escapement, and one of said circuit means being controlled by the operation of said carriage return means for magnetically erasing matter from the tape.

7. In a device of the character described, the combination with a machine having a movable work sheet supporting carriage, key means for entering data on said sheet, and escapement means operated by said key means for controlling the movement of said carriage in data entering direction; of a tape unit including belt means for moving said tape and a clamp on the carriage for moving said belt means with the movements of said carriage, circuit means including a make and break means operable with said escapement and recording means controlled by said key means for magnetically recording on a tape of the unit the data entered on said sheet, and tabulating control means for releasing said escapement to automatically record fill characters in succession on said tape by operation of said make and break means as the carriage moves in the data entering direction.

8. In a device of the character described, the combination with a machine having a movable work sheet supporting carriage, key means for entering data on said sheet, key controlled escapement means for regulating the movement of said carriage and key controlled means for backspacing said carriage; of a tape unit including a tape, a belt driven by said carriage for feeding said tape and a head for magnetically recording said data on the tape, circuit means controlled by said key means and by said escapement means for applying a current of one polarity to said head to record said data on the tape magnetically as the carriage moves in writing direction and for applying a current of another polarity to said head to erase said data from the tape when the carriage moves in return direction and means operated by said backspacing means for conditioning said circuit means to momentarily prevent flow of any current through said head while said carriage is back spacing.

9. In a device of the character described, the combination with a machine having a movable work sheet supporting carriage, key means for entering data on the sheet, carriage return means, and detent means for controlling operation of said carriage return means; of a tape unit including a tape and a recording head for magnetizing said tape, and circuit means for applying current of one polarity to said head to record said data magnetically on the tape and for applying current of another polarity to said head to erase data from the tape as the carriage moves in writing and return directions, key means for releasing said detent for operation of said carriage return means and means operated by said releasing means for conditioning said circuit means to prevent flow of current through said head during carriage returning movement.

10. In a device of the character described, the combination with a machine having a movable work sheet supporting carriage, key means for entering data on the sheet, carriage return means and detent means for controlling operation of said carriage return means; of a tape unit including a tape and a recording head for magnetizing said tape, circuit means controlled by said key means for applying a current of one polarity to said head, key means for releasing said detent for operation of said carriage return means and means operated by said releasing means for conditioning said circuit means to provide flow of current of another polarity through said head during carriage returning movement.

11. In a device of the character described, the combination with a machine having a movable work sheet supporting carriage, means for entering data on said sheet and escapement means for controlling the movement of said carriage; of a tape unit, circuit means including recording means controlled by the operation of said data entering means for supplying recording current of one polarity and erase current of reverse polarity to a magnetic tape of said unit, carriage return means including said escapement, and one of said circuit means being controlled by the operation of said carriage return means for entering erase current on the tape.

12. In a device of the character described, the combination with a machine having a movable work sheet supporting carriage, key means for entering symbols on the sheet, escapement means governed by said key means for controlling the movement of said carriage in symbol spacing direction and means for returning the carriage; of a tape unit including a tape, means associated with said carriage for moving said tape, and a recording head for magnetizing said tape; circuit means for applying current of one polarity to said head to record representations of said symbols on the tape and for applying current of reverse polarity to clear the tape, and erase key means for controlling the operation of said carriage return means and the operation of said circuit means for applying said current of reverse polarity to the head to clear said tape.

13. A typewriter having a movable work sheet supporting carriage, key mechanism for entering characters on said sheet escapement means operated by said mechanism for controlling the movement of said carriage, clamp means on said carriage, a tape feeding unit including a tape, belt means arranged to be gripped by said clamp and operable to feed said tape, circuit means including means settable by said key mechanism for encoding the characters entered on said sheet, means for recording magnetically on the tape the encoded representations of said characters and switch contacts; and switch means operable by said escapement and having opposite make and break faces engaged by said contacts for controlling the operation of said circuit means and said circuit means including latch means for restoring the encoding means to unset condition upon operation of said switch means.

14. A machine as set forth in claim 13 in which the opposed make and break faces of said switch means are offset with respect to each other whereby the recording means is operated through said circuit means prior to restoration of said encoding means to unset condition.

15. In a machine for printing data on a work sheet and simultaneously recording said data magnetically on a tape, a typewriter mechanism including, a movable carriage, a clamp on said carriage, type bars presenting upper and lower type characters, keyboard controlled means for operating said type bars in printing action, a tape unit including a tape feeding belt adapted to be operated by said clamp, circuit means including a magnetic head for magnetically recording data on the tape as it moves with said carriage, a unit for encoding the data being printed, said unit being operable by said type bar operating means for controlling said circuit means, shift means for varying the relation of the printing line to the type characters and means controlled by said shift means for conditioning said encoding unit in accordance with said variation.

16. A machine as set forth in claim 5 in which said means for backspacing includes key lever means, carriage escapement means including a detent, means controlled by said lever means for causing the detent to unblock said escapement and move the escapement means in carriage backspacing operation, circuit means including a switch controlled by the movement of said escapement moving means, and an actuator controlled by said switch for augmenting the operation of said key lever means.

17. In a machine of the character described, key lever means, encoding means including code keys movable by said key means and each having projections extending from opposite edges thereof and a bank of code strips arranged in flanking relation to said code keys and adapted to be individually moved thereby; said strips presenting differentially notched edges for register with said projections, and means for moving said bank of strips as a unit for permutational adjustment with respect to said keys and circuit closing means associated with said code strips.

18. In a machine of the character described, data recording key means, case shift key means, means for encoding the data recorded including code keys movable by said recording key means and each having projections extending from a side thereof and a bank of code strips common to said projections and adapted to be selectively moved thereby; said strips presenting differentially notched edges for register with said projections, means operated by said case shift key means for moving said bank of strips for permutational adjustment with respect to said keys, and circuit closing means associated with said code strips.

19. A machine as set forth in claim 15 in which said shift means for varying the relation of the printing line to the type characters includes case shift key means, movable means for mounting said type bars, coacting means for yieldably resisting movement of said mounting means in one direction with respect to said printing line including a spring and a spring urged arm, a plate pivoted on said mounting means and having a demountable pin and notch connection with said arm, means operated by said case shift key means for moving the mounting means against the resistance of said coacting means, and means actuated by said case shift key means for dismounting said plate to remove the resistance of said spring urged arm to said movement of the mounting means.

References Cited in the file of this patent

UNITED STATES PATENTS

| | | |
|---|---|---|
| 606,944 | Sears | July 5, 1898 |
| 662,834 | Tcherkassov | Nov. 27, 1900 |
| 1,667,007 | Hokanson | Apr. 24, 1928 |
| 1,945,097 | Thompson et al. | Jan. 30, 1934 |
| 2,294,662 | Helmond | Sept. 1, 1942 |
| 2,318,299 | Doty | May 4, 1943 |
| 2,506,703 | Chisholm | May 9, 1950 |
| 2,517,989 | Dodge | Aug. 8, 1950 |
| 2,558,187 | Marrison | June 26, 1951 |
| 2,559,637 | Kirchel | July 10, 1951 |
| 2,567,812 | Hickman | Sept. 11, 1951 |
| 2,652,196 | Sterling | Sept. 15, 1953 |
| 2,660,617 | Hajek | Nov. 24, 1953 |
| 2,672,395 | Lewis | Mar. 16, 1954 |
| 2,688,656 | Wright | Sept. 7, 1954 |
| 2,751,433 | Linger | June 19, 1956 |

FOREIGN PATENTS

| | | |
|---|---|---|
| 679,259 | Germany | Aug. 8, 1939 |